(12) United States Patent
Norrell

(10) Patent No.: US 6,763,781 B1
(45) Date of Patent: Jul. 20, 2004

(54) SPINNER UNIT

(76) Inventor: James Edward Norrell, 5382 Riverview Dr., Robstown, TX (US) 78380

( * ) Notice: Subject to any disclaimer, the term of this patent is extended or adjusted under 35 U.S.C. 154(b) by 72 days.

(21) Appl. No.: 10/225,734

(22) Filed: Aug. 21, 2002

(51) Int. Cl.$^7$ .......................... A01K 1/00; A01K 39/00; A01K 5/00
(52) U.S. Cl. .................. 119/57.91; 119/51.13
(58) Field of Search .............. 119/57.91, 57.92, 119/51.01, 51.11, 51.13, 56.1; 239/668, 650, 681, 689

(56) References Cited

U.S. PATENT DOCUMENTS

| | | |
|---|---|---|
| 321,703 A | 7/1885 | Foster |
| 1,355,399 A | 10/1920 | Kelley |
| 2,934,037 A | 4/1960 | Ernest |
| 3,195,508 A | 7/1965 | Lehman et al. |
| 3,537,649 A | 11/1970 | Der Lely et al. |
| 4,027,627 A | 6/1977 | Fillion |
| 4,167,248 A | 9/1979 | Akazawa et al. |
| 4,470,522 A | 9/1984 | Lents et al. |
| 4,497,446 A | 2/1985 | Der Lely et al. |
| 4,565,159 A | 1/1986 | Sweeney |
| 4,580,730 A | 4/1986 | Amerine |
| 4,945,859 A | 8/1990 | Churchwell |
| 4,986,220 A | 1/1991 | Reneau et al. |
| 5,143,289 A | 9/1992 | Gresham et al. |
| 5,259,337 A | 11/1993 | Rasmussen |
| 5,333,572 A | 8/1994 | Nutt |
| 5,463,980 A | 11/1995 | Rasmussen |
| 5,732,652 A | 3/1998 | Allen |
| 5,820,035 A | 10/1998 | Johnson et al. |
| 6,082,300 A | 7/2000 | Futch |

FOREIGN PATENT DOCUMENTS

| | | | |
|---|---|---|---|
| GB | 2075322 | * | 4/1980 |
| GB | 1594447 | * | 6/1981 |
| JP | 405284875 A | | 11/1993 |

* cited by examiner

*Primary Examiner*—Charles T. Jordan
*Assistant Examiner*—Judith A. Nelson

(57) ABSTRACT

My invention provides a spinner unit for attachment to the intermittently rotating vertical control unit shaft of an animal feeder, the feeder having a feed storage unit that discharges feed through a discharge tube into a spinner unit housing interior, where the feed is enclosed prior to discharge from specially configured discharge openings. The extensive covering configuration provided by the housing top, bottom and in some embodiments, sides, allows little or no feed to be thieved by small animals such as birds, prevents feed loss from wind, and prevents feed from being thrown up and off the spinner unit when the spinner unit is spinning.

17 Claims, 32 Drawing Sheets

SPINNER UNIT

BACKGROUND OF THE INVENTION

1. Field of the Invention

The field of the invention is animal and wildlife feeders, or, more specifically, enclosed spinner units for replacing spinner plates used for distributing feed from the feeders.

2. Description of Related Art

In the current art of animal and wildlife feeders, it is typical for the feeder to have a motorized control unit that intermittently rotates a vertically oriented shaft to which is attached a spinner plate. The spinner plate is positioned beneath a feed storage unit, the storage unit allowing feed, such as corn, to discharge through a tube directed onto the spinner plate. The spinner plate is typically rotated for about 8 seconds, twice a day, leaving the spinner plate stationary for long periods of time with a full load of feed from the feed storage unit. When the control unit shaft rotates the spinner plate the feed is thrown from the plate, in response to the centrifugal forces generated by the rapid spinning of the spinner plate.

Thieving birds and small animals have plagued feeder operators for years. For example, spinner plates leave substantial amounts of feed exposed to such animals, either near the discharge tube, on the top of the spinner plate, generally, or at the spinner plate discharge openings, where the openings allow birds to insert their heads into the opening to gain access to the feed.

Another operator problem is the inability of the spinner plate to prevent feed from being thrown upwardly from the spinner plate as it spins, leaving substantial amounts of feed to fall beneath the feeder instead of being thrown clear of the feeder to an area of some distance from the feeder. Some wildlife, such as deer, tend to feed in families or segregated groups, and do not prefer to feed near the feeder where they are unnecessarily close to other families or groups. A related problem is the inability of many spinner plates to maximize the distance the feed travels from the feeder, and to throw the feed in a consistent and uniform manner in a circular area about the feeder.

Many existing spinner plates are highly subject to wind dislodging feed from the spinner plate while the spinner plate is stationary. Feed dislodged in this manner lands beneath, or much too close to the feeder, resulting in substantial loss of feed, to the point that the feed storage unit can be emptied by the continued discharge of feed onto a spinner plate cleared by the wind. Feeders are often left unattended for extended periods of time, and this problem can cause a feeder to be emptied and useless for long periods of time.

For example, U.S. Pat. No. 4,986,220 to Reneau, et al. leaves substantial amounts of feed uncovered allowing small animal access to the feed through the open plate in areas around the sleeve (reference 50 on FIG. 3). The Reneau device also has no structure for enhancing the consistency and uniformity of the feed distribution, instead having a wide, gated mouth. The large areas of feed without a covering top also allow feed to be thrown up and off the spinner plate. The Reneau gates are also subject to being flipped backward over the top of the spinner plate, leaving feed exposed at the openings. Similarly, U.S. Pat. No. 5,143,289 to Gresham, et al. allows unnecessarily easy small animal access due to the lack of a covering top and sides, above and around, significant portions of the feed. (See FIGS. 3–4)

Another example is U.S. Pat. No. 3,195,508 to Lehman, et al., which has an open spinner plate with little protection from small animals or the wind. U.S. Pat. No. 5,820,035 to Johnson, et al. has a similarly open spinner plate.

U.S. Pat. No. 1,355,399 to Kelley is a round tube device that leaves discharge openings of such size as to allow a bird to insert its head within the opening, thus gaining access to the feed. The diameter is uniform and has no significant structure for enhancing the consistency and uniformity of the feed distribution pattern. Simple discharge interference lips (reference B4 on FIGS. 3–4) restrict the feed discharge and provide some control over the distribution radius.

While these devices may function generally with respect to the purposes for which they were designed, they would not be as suitable for the purposes of the present invention, as hereinafter described. For example, such devices, do not provide what is needed, that is a spinner unit that encloses the feed in the spinner unit housing such that little or no top access is available to small animals, little or no access through the discharge openings is available to such animals, little or no feed is thrown up and off the spinner unit due to an inadequate covering configuration, little or no feed is dislodged from the spinner unit by wind, and the distribution pattern of the feed is enhanced for consistency and uniformity.

SUMMARY OF THE INVENTION

The present invention overcomes the shortcomings of the prior art by providing a spinner unit that encloses the feed in the spinner unit housing such that little or no top access is available to small animals. A special housing top is configured to cover all feed from the inlet that receives the feed from the feed storage unit discharge tube to the housing discharge openings. Similarly, little or no feed is thrown up and off the spinner unit due since such upward movement is prevented by the special housing cover configuration.

Also, little or no access through the housing discharge openings is available to such animals. Such openings are carefully sized and shaped to stop birds from inserting their heads through the discharge openings. Furthermore, little or no feed is dislodged from the spinner unit by wind due to the special enclosure of the feed by the spinner unit housing top and bottom, the symmetry of the housing rapidly turning the spinner unit to a sideways position such that the wind does not blow directly into the housing discharge openings.

Additionally, the distribution pattern of the feed is enhanced for consistency and uniformity in embodiments having a housing taper extending toward each housing discharge opening. This creates a symmetrical opening of reduced diameter that creates a jetting effect that contributes to a larger distribution distance and a uniform and consistent distribution pattern.

Also, in some embodiments, covers are placed over the housing openings that will not flip backwards on to the top of the spinner unit. Such covers are also prevented from rotating rearwardly into the spinner unit interior.

My invention provides a spinner unit for attachment to a substantially vertical rotating shaft of a control unit of a feeder, the control unit having a motor for rotating the shaft, the feeder having a feed storage unit for storing feed and discharging stored feed in a downward direction, the spinner unit comprising: a housing having a top and a bottom, the top and bottom being joined to form a housing interior, and to further form a first opening and a second opening, the top having an inlet for receiving feed from the feed storage unit into the housing interior, the housing having a maximum horizontal transverse width at the inlet that is greater than a maximum horizontal width of the housing at the first opening and a maximum horizontal width of the housing at the second opening, the top and bottom enclosing received feed in the interior such that feed proximate the first and second openings is covered by the housing top; and a shaft attachment member for attaching the housing to the control unit rotating shaft, such that when the shaft rotates, the housing spins, and received feed is forced from the housing interior through the first and second openings.

In one embodiment, the housing top and bottom enclose received feed in the housing interior such that the top substantially covers received feed in the interior between the top inlet and the first opening, and in the interior between the top inlet and the second opening.

In one embodiment, the housing top and bottom join to form a plurality of sides between the first and second openings.

In one embodiment, the formed sides are substantially vertical.

In one embodiment, the housing top extends beyond the housing bottom proximate at least one of the first opening and the second opening.

In one embodiment, the spinner unit further comprises a first opening cover attached to the housing for opening and closing over the first opening and a second opening cover attached to the housing for opening and closing over the second opening, the covers being attached such that the covers open when the housing is spinning, in response to centrifugal force.

In one embodiment, the feed storage unit has a discharge member through which the received feed is discharged from the feed storage unit, and the housing top inlet closely receives the discharge member.

In one embodiment, the housing has a longitudinal axis extending between the first and second openings, the housing top having an apex aligned with the longitudinal axis.

In one embodiment, the housing has a longitudinal axis extending between the first and second openings, the housing bottom having an apex aligned with the longitudinal axis.

In one embodiment, the housing has a longitudinal axis extending between the first and second openings, the housing top and bottom each having an apex aligned with the longitudinal axis.

In one embodiment, the housing top is curved.

In one embodiment, the housing bottom is curved.

In one embodiment, the housing top and bottom are curved.

I have provided a spinner unit for attachment to a substantially vertical rotating shaft of a control unit of a feeder, the control unit having a motor for rotating the shaft, the feeder having a feed storage unit for storing feed and discharging stored feed in a downward direction, the spinner unit comprising: a housing having a top, a bottom, a plurality of sides, and a plurality of side openings, the top, bottom and sides being joined to form a housing interior, the top having an inlet for receiving feed from the feed storage unit into the housing interior, the top, sides and bottom enclosing received feed in the interior such that received feed proximate the side openings is covered by the housing top; and a shaft attachment member for attaching the housing to the control unit rotating shaft, such that, when the shaft rotates, the housing spins, and received feed is forced from the housing interior through the side openings.

In one embodiment, the housing top and bottom enclose received feed in the housing interior such that the top substantially covers received feed in the interior between the top inlet and each of the side openings.

In one embodiment, the number of sides is two.

In one embodiment, the housing top and bottom are substantially circular in a plane substantially perpendicular to the control unit rotating shaft.

In one embodiment, the spinner unit further comprises an interior guide for each of the plurality of side openings, the interior guides being positioned adjacent the openings such that received feed contacting the guides is guided to the opening adjacent the contacted guide.

In one embodiment, the housing sides are substantially straight and perpendicular to the housing top, the sides having a height, each side having substantially the same height, the housing top having a width, the side heights being less than the housing top width.

In one embodiment, the number of sides is four.

In one embodiment, the housing top and bottom are substantially hexagonal in a plane substantially perpendicular to the control unit rotating shaft.

In one embodiment, the number of sides is six.

In one embodiment, the housing top and bottom are substantially octagonal in a plane substantially perpendicular to the control unit rotating shaft.

In one embodiment, the sides are substantially perpendicular to the housing top.

In one embodiment, the spinner unit further comprises a plurality of covers attached to the housing for opening and closing over each of the side openings, the covers being attached such that the covers open when the housing is spinning, in response to centrifugal force.

In one embodiment, the covers are attached such that the housing top prevents the covers from rotating to a position over the housing top.

In one embodiment, the covers are sized such that, when the covers are in the closed position, the housing bottom prevents the covers from rotating into the housing interior.

In one embodiment, the feed storage unit has a discharge member through which the received feed is discharged from the feed storage unit, and the housing top inlet closely receives the discharge member.

A spinner unit is provided for attachment to a substantially vertical rotating shaft of a control unit of a feeder, the control unit having a motor for rotating the shaft, the feeder having a feed storage unit for storing feed and discharging stored feed in a downward direction, the spinner unit comprising: a housing having a top, a bottom, a plurality of sides, a first opening and a second opening, the top, bottom and sides being joined to form a housing interior, the top, bottom and sides having a first end defining the first opening as a polygon, the top, bottom and sides having a second end defining the second opening as a polygon, the first and second openings each having a height and a width, the height of each such opening being less than the width of each such opening, the top having an inlet for receiving feed from the feed storage unit into the housing interior, the top, sides and bottom enclosing received feed in the interior such that received feed proximate the openings is covered by the housing top; and a shaft attachment member for attaching the housing to the control unit rotating shaft, such that, when the shaft rotates, the housing spins, and received feed is forced from the housing interior through the openings.

In one embodiment, the top and bottom enclose received feed in the housing interior such that the top substantially covers received feed in the interior between the top inlet and the first opening, and in the interior between the top inlet and the second opening.

In one embodiment, the number of sides is four and the first and second openings are hexagonally defined.

My invention provides a spinner unit for attachment to a substantially vertical rotating shaft of a control unit of a feeder, the control unit having a motor for rotating the shaft, the feeder having a feed storage unit for storing feed and discharging stored feed in a downward direction, the spinner unit comprising: a housing having a top, a bottom, four sides, and two side openings, the sides being substantially perpendicular to the top and bottom, the top, bottom and sides being joined to form a housing interior, the top and bottom being substantially hexagonal in a plane substantially perpendicular to the control unit rotating shaft, the top having an inlet for receiving feed from the feed storage unit into the housing interior, the housing top and bottom enclosing received feed in the housing interior such that the top substantially covers received feed in the interior between the top inlet and each of the side opening; and a shaft attachment member for attaching the housing to the control unit rotating shaft, such that, when the shaft rotates, the housing spins, and received feed is forced from the housing interior through the side openings.

The foregoing features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

The following discussion describes in detail exemplary embodiments of the invention. This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
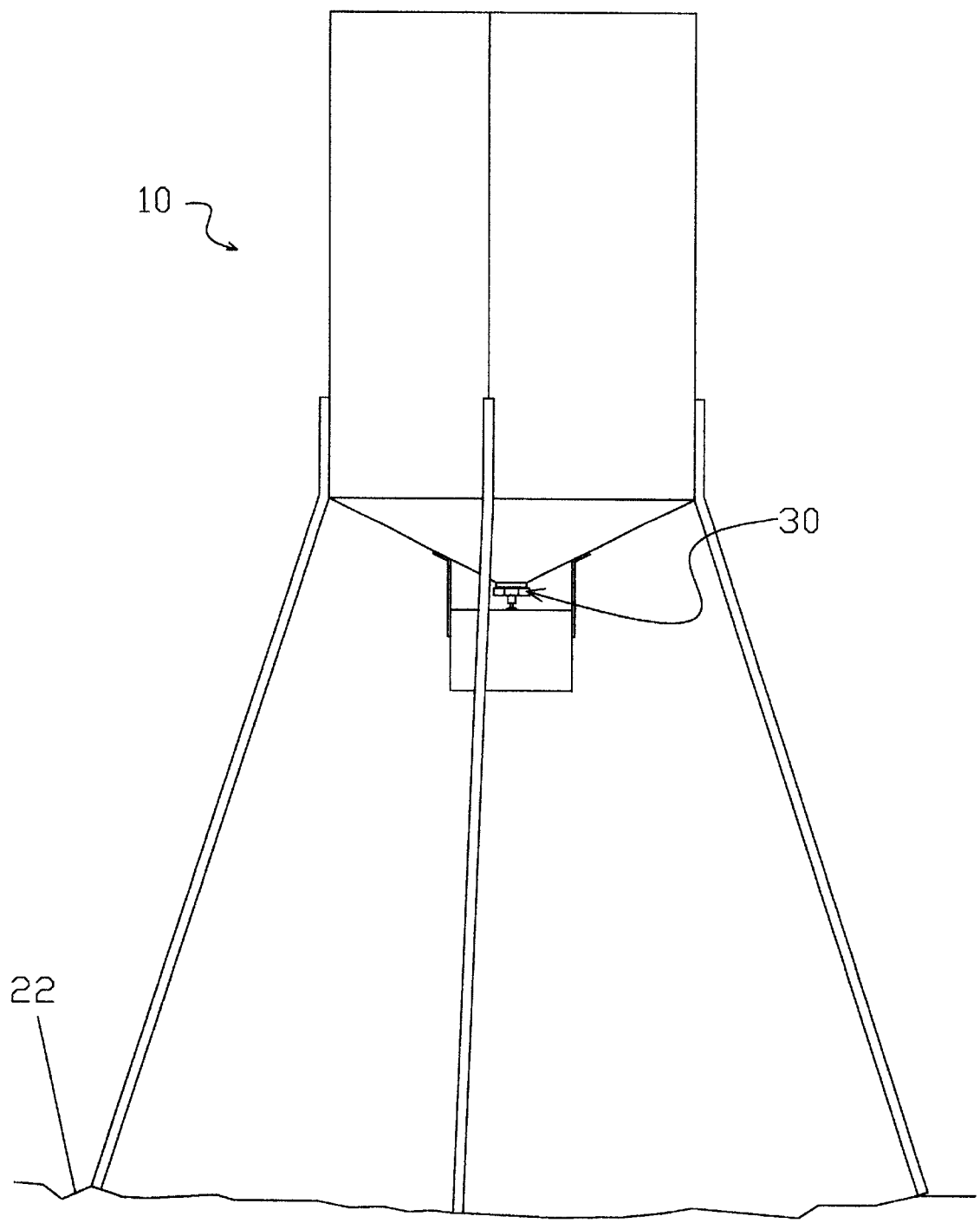
FIG. 1 is a view illustrating the use of an example embodiment of the present invention on an animal feeder.
Figure 2:
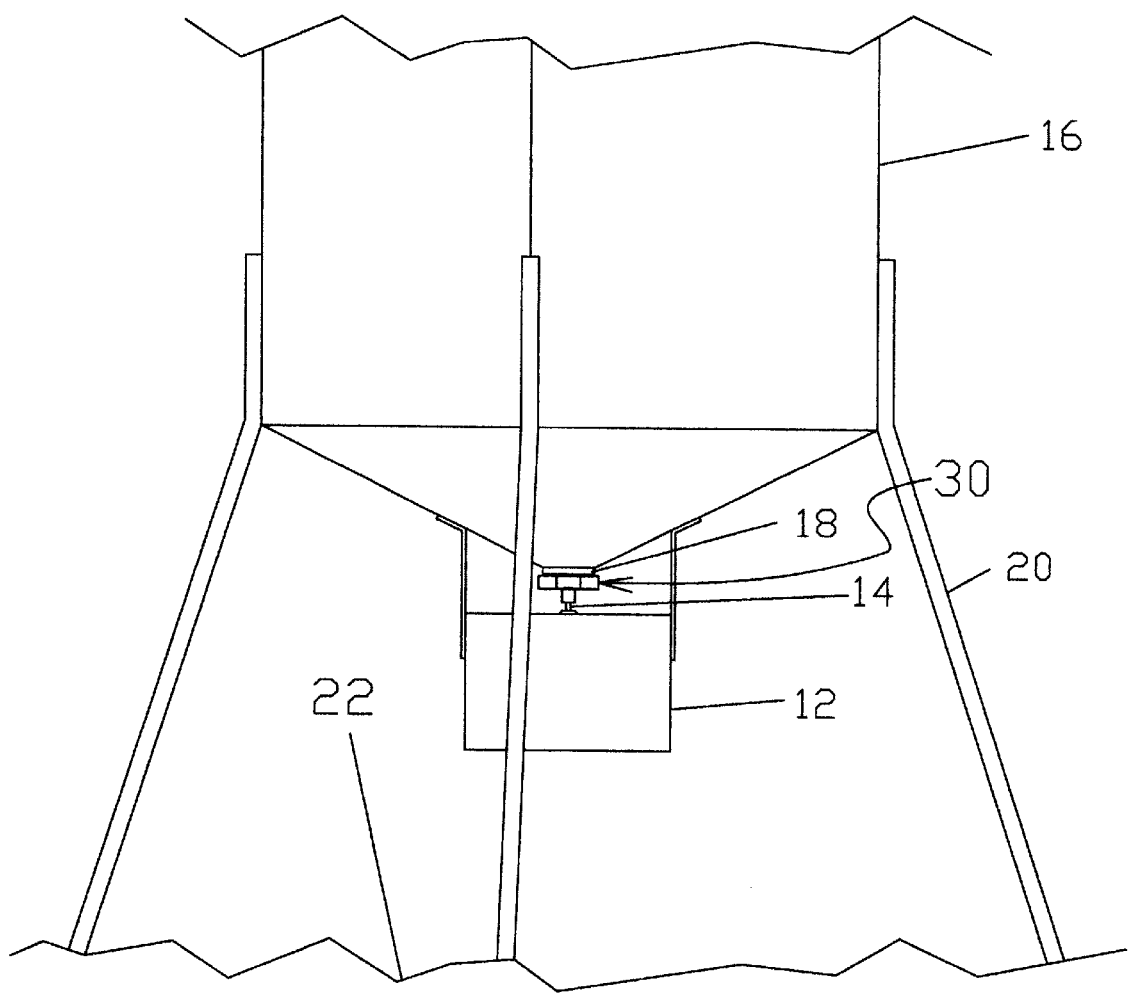
FIG. 2 is a cutaway section of the feeder unit shown completely in FIG. 1.

An exemplary embodiment of a spinner unit 30 of the present invention is illustrated in FIGS. 1–5. In FIGS. 1–2, the exemplary spinner unit 30 is shown in use on a typical animal feeder 10 of the type having a battery-powered, motorized control unit 12, having an upwardly directed shaft 14 to which the spinner unit 30 is attached. The control unit 12 is attached to feeder structure including a feed storage unit 16, the feed storage unit containing animal feed that exits through a feed storage unit discharge member 18. The discharge member 18 is typically tube-shaped and extends downwardly from the feed storage unit 16, allowing feed to exit in a downward direction. The feed storage unit 16 is typically supported above the ground 22 by legs 20.

Figure 3:
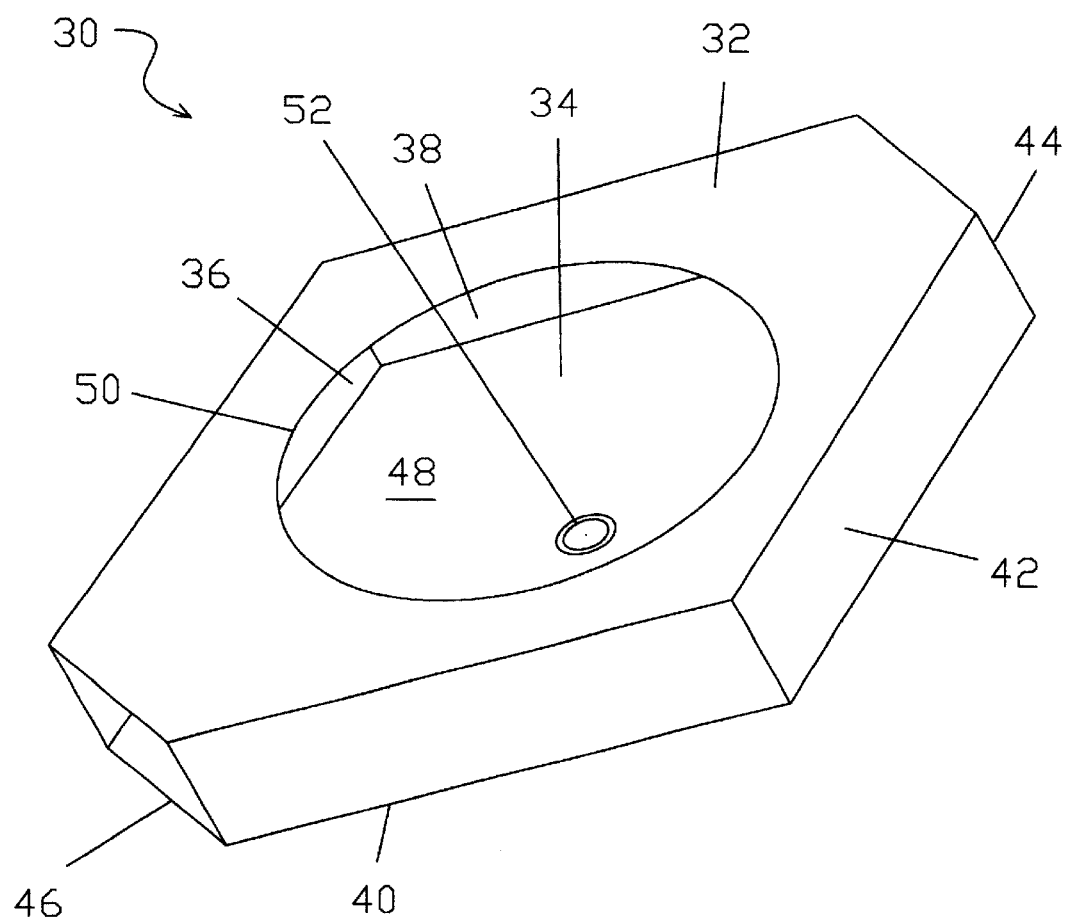
FIG. 3 is a perspective view of an example embodiment of the present invention.

As shown in FIG. 3, this exemplary spinner unit 30 has a housing formed by a generally planar top 32 and bottom 34 joined by four sides 36,38,40,42. In this exemplary embodiment, the sides are substantially perpendicular to the housing top and bottom. The housing top, bottom and two sides 38,42 terminate to define a housing first opening 44. Similarly, the housing top, bottom and two sides 36,40 terminate to define a housing second opening 46. The housing top, bottom and four sides form an interior 48 into which feed is received from the feed storage unit discharge member 18 through an inlet 50. In this exemplary embodiment 30, the sides are substantially perpendicular to the housing top 32, and the housing top and bottom are substantially hexagonal when viewed in a plane perpendicular to the shaft 14 and parallel to the ground surface 22. In one embodiment, the housing top, bottom and four sides are constructed from metal, e.g. aluminum or stainless steel, while other embodiments are constructed from other metals and plastics.

Figure 5:
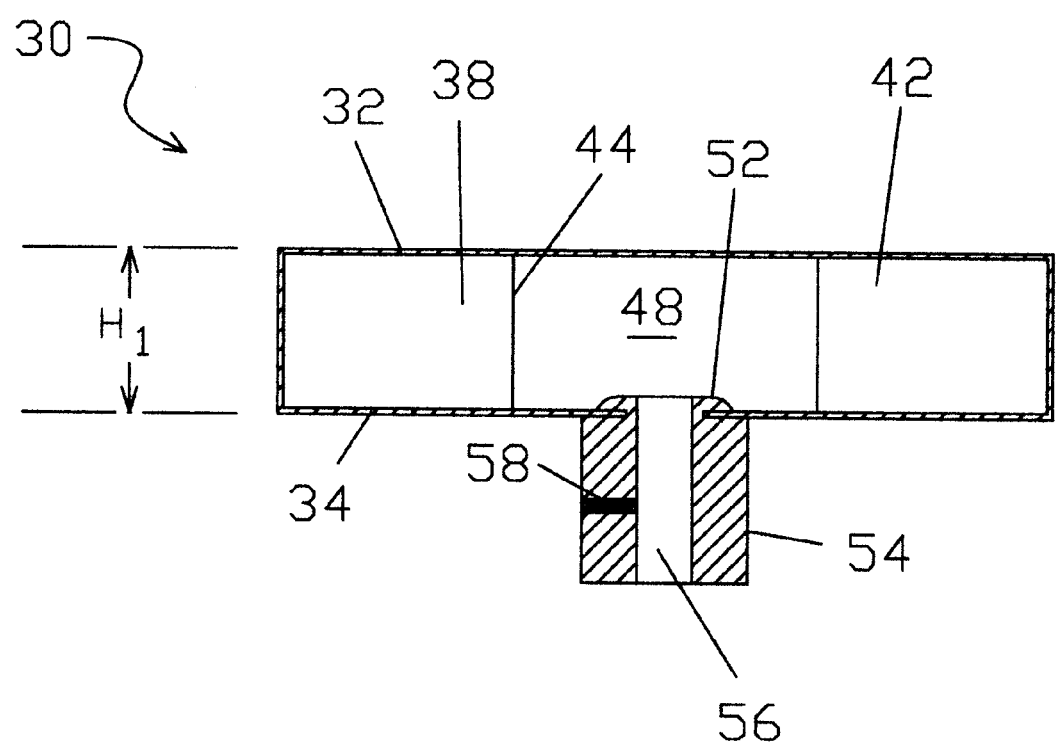
FIG. 5 is a sectional view taken along cutting plane 5—5 as shown on FIG. 4.

The exemplary spinner unit 30 is shown in FIG. 5 to have a shaft attachment member, in this case a collar 54, attached to the housing bottom 34 using a press fit 52, whereby the collar is shouldered on the top such that a portion extends through a hole in the housing bottom, the portion then being flared and spread against the housing bottom. The collar has a bore 56 for receiving the control unit shaft 14. The shaft is secured in the bore using a typical set screw in threaded set screw hole 58. When the spinner unit 30 is thus attached to the shaft 14, the spinner unit is positioned such that the housing top 32 and bottom 34 are substantially horizontal to the ground surface 22 and perpendicular to the shaft 14.

Figure 4:
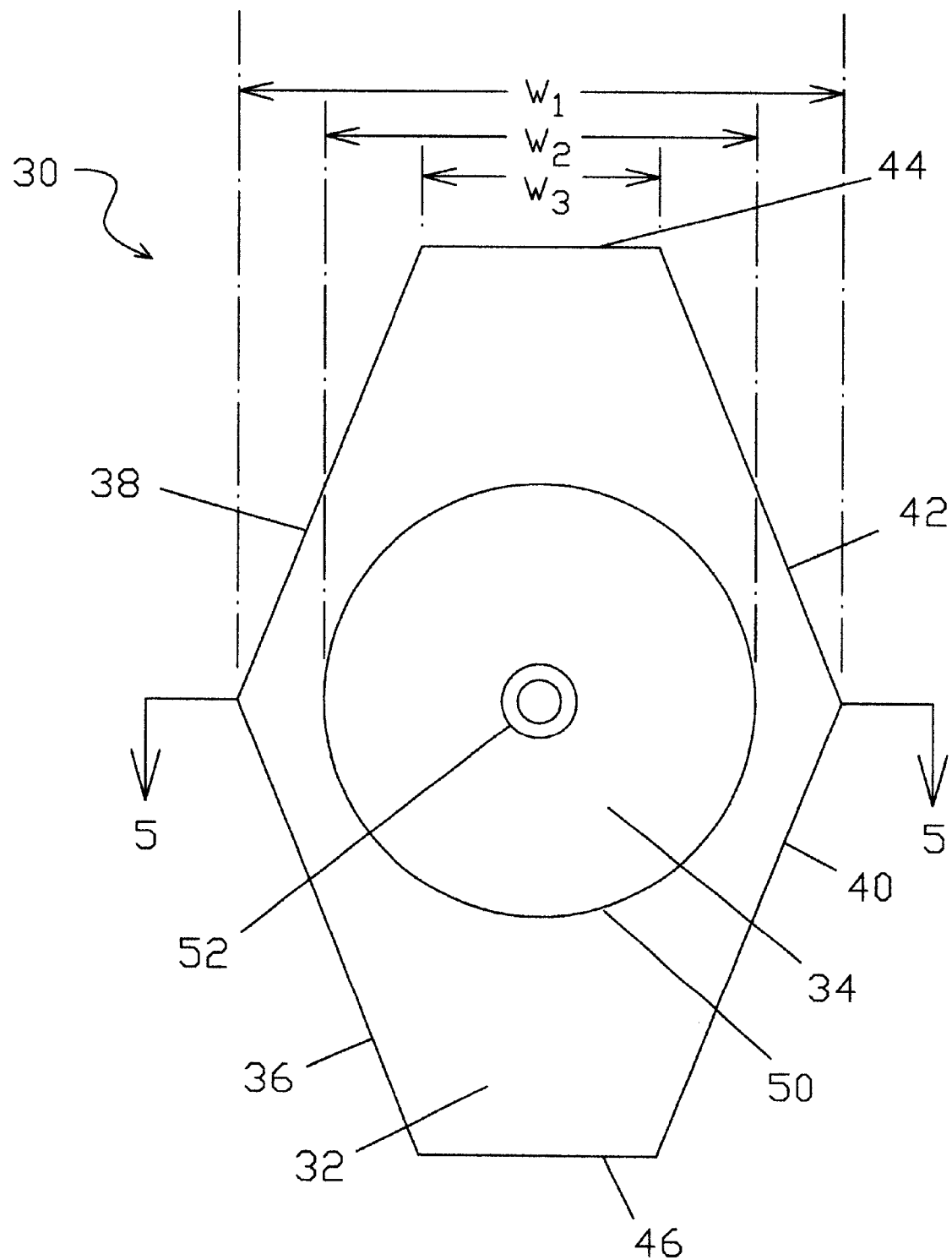
FIG. 4 is a top view of the example embodiment of the present invention shown in FIG. 3.

The top view of the exemplary spinner unit 30 is shown in FIG. 4. A maximum horizontal transverse width $W_1$ of the housing is measured at the inlet 50, the inlet having a maximum horizontal transverse width $W_2$. The housing width $W_1$ is greater than the housing first opening 44 maximum horizontal width $W_3$, the width $W_3$ also being the width of the housing second opening 46. The first and second openings are shown to have a height $H_1$. For this exemplary embodiment of the spinner unit 30, width $W_1$ is approximately 3.5 inches (89 millimeters), width $W_2$ is approximately 2.5 inches (64 millimeters), width $W_3$ is approximately 1.375 inches (35 millimeters), and height $H_1$ is approximately 0.75 inches (19 millimeters).

When in use, the exemplary spinner unit of FIGS. 3–5 receives feed from the feed storage unit discharge tube 18 through the housing inlet 50 into the housing interior 48. The feed settles within the housing interior 48 and toward the housing first and second openings 44, 46. In common practice, the control unit 12 rotates the shaft 14 intermittently, such that the spinner unit 30 is stationary for extended periods of time.

As shown for this exemplary spinner unit 30 in FIG. 4, housing top 32 covers any feed proximate the housing first opening 44 and housing second opening 46, and also covers feed from the inlet 50 to the housing first opening and from the inlet to the housing second opening. Only feed that settles within the inlet circumference, when viewed from the top, is left uncovered by the housing top. The inlet typically has a diameter of approximately 2.5 inches (64 millimeters) and the feed storage unit discharge tube 18 will have an outer diameter of approximately 1.875 inches (48 millimeters), thus the discharge tube is closely received by the inlet. This leaves a circumferential opening of approximately 0.3125 inch (8 millimeters) between the inlet edge and the discharge tube 18. This opening is sufficiently small such that very little feed is thrown upwardly through the inlet when the spinner unit 30 is spinning, and, when the unit 30 is stationary, birds are almost entirely prevented from thieving feed from the interior 48, and the feed is effectively isolated from the wind. The height $H_1$ of the openings is sufficiently small such that birds are prevented from inserting their heads into the first and second openings 44,46 to steal feed.

At predetermined intervals, the control unit 12 motor spins the shaft 14 causing the spinner unit 30 to spin in a substantially horizontal plane. As the spinner unit 30 spins, feed is discharged from the spinner unit through the housing first opening 44 and the housing second opening 46 due to the centrifugal forces acting on the feed. Because of the difference between the housing first and second opening widths $W_3$ and the housing maximum horizontal transverse width at the inlet $W_1$, the feed is discharged in a jetted fashion, and the feed is thrown farther, and more evenly, from the spinner unit than if the widths $W_1$ and $W_3$ were equal.

Figure 6:
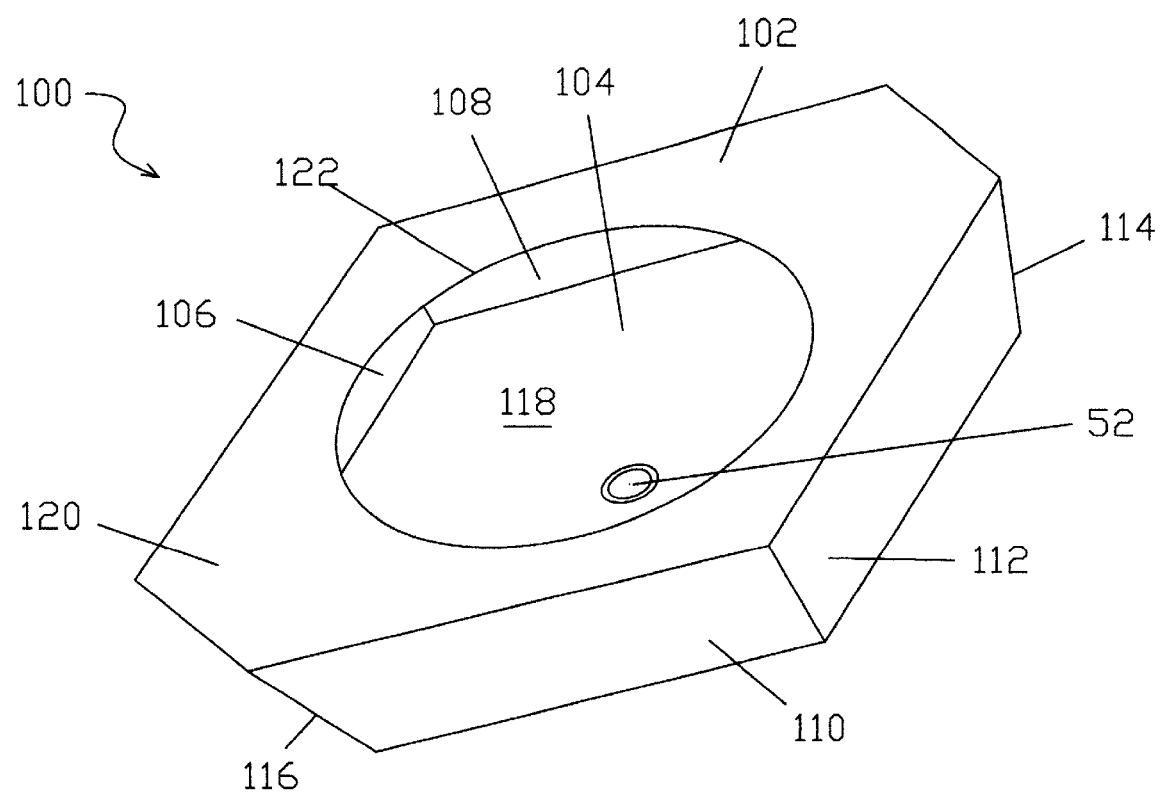
FIG. 6 is a perspective view of an example embodiment of the present invention.
Figure 7:
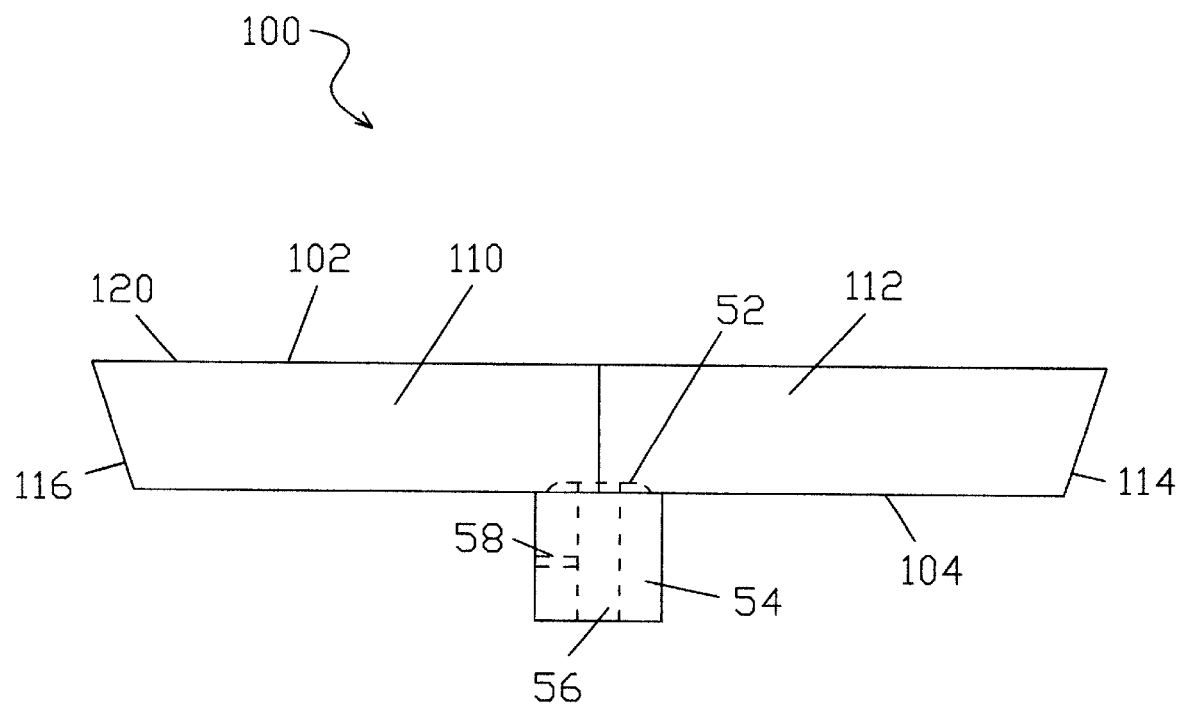
FIG. 7 is a side view of the example embodiment of the present invention shown in FIG. 6.

Turning now to FIG. 6 and FIG. 7, another exemplary embodiment of a spinner unit 100 of the present invention is shown to include a housing top 102, bottom 104, sides 106, 108, 110, 112 that form an interior 118, and the housing top having an inlet 122. In this exemplary embodiment, the housing top and sides are shaped to form a housing first opening 114 and second opening 116, with the housing top having an extension 120 that extends beyond the housing bottom. The extension 120 makes it even more difficult for a bird to access feed through the first or second openings. As shown in FIG. 7 the sides are tapered from the housing top extension to the housing bottom.

Figure 8:
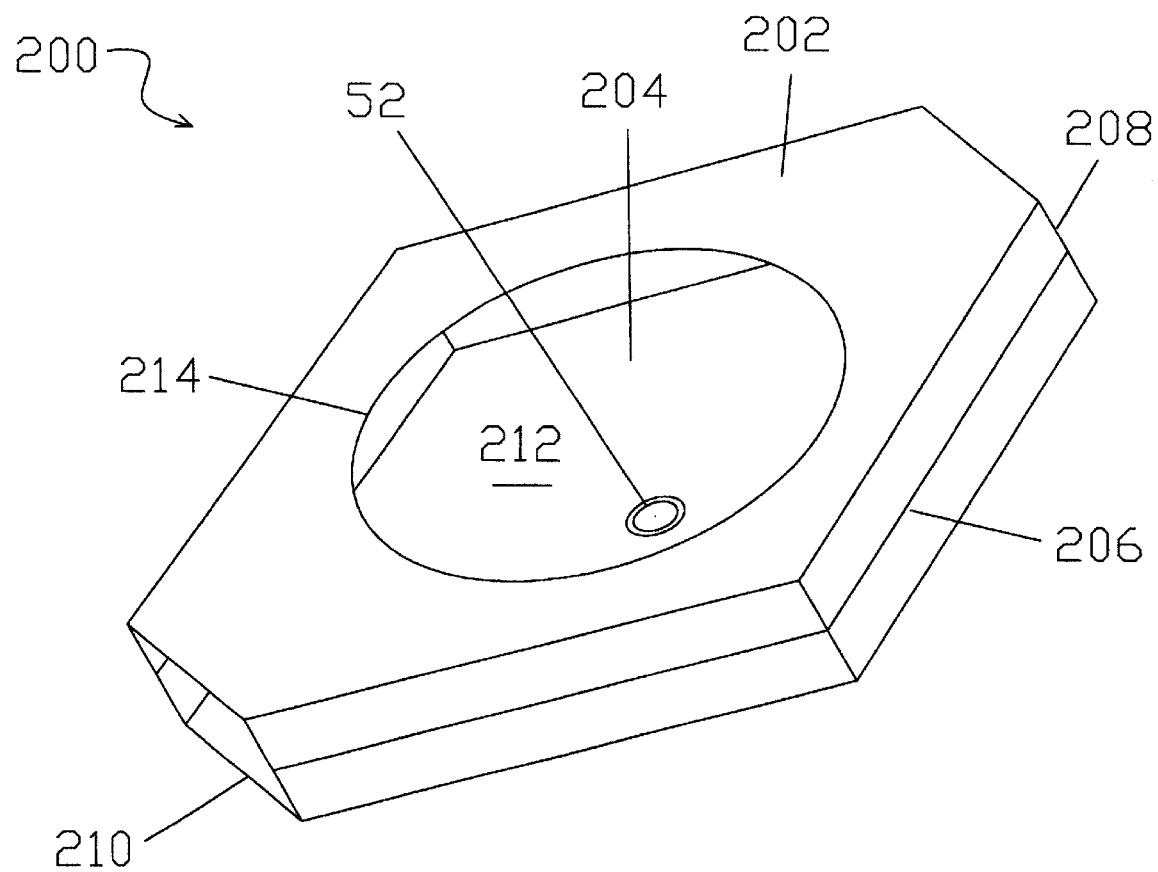
FIG. 8 is a perspective view of an example embodiment of the present invention.

FIG. 8 depicts another exemplary embodiment of the spinner unit 200 of the present invention. In this embodiment, reflective of spinner unit construction options, a housing top 202 and housing bottom 204 are turned along their edges to form sides joining along seam 206. In this embodiment, the top, bottom and formed sides enclose an interior 212 and form a first opening 208 and a second opening 210. The housing top includes an inlet 214 that closely receives the feed storage unit discharge tube 18.

Figure 9:
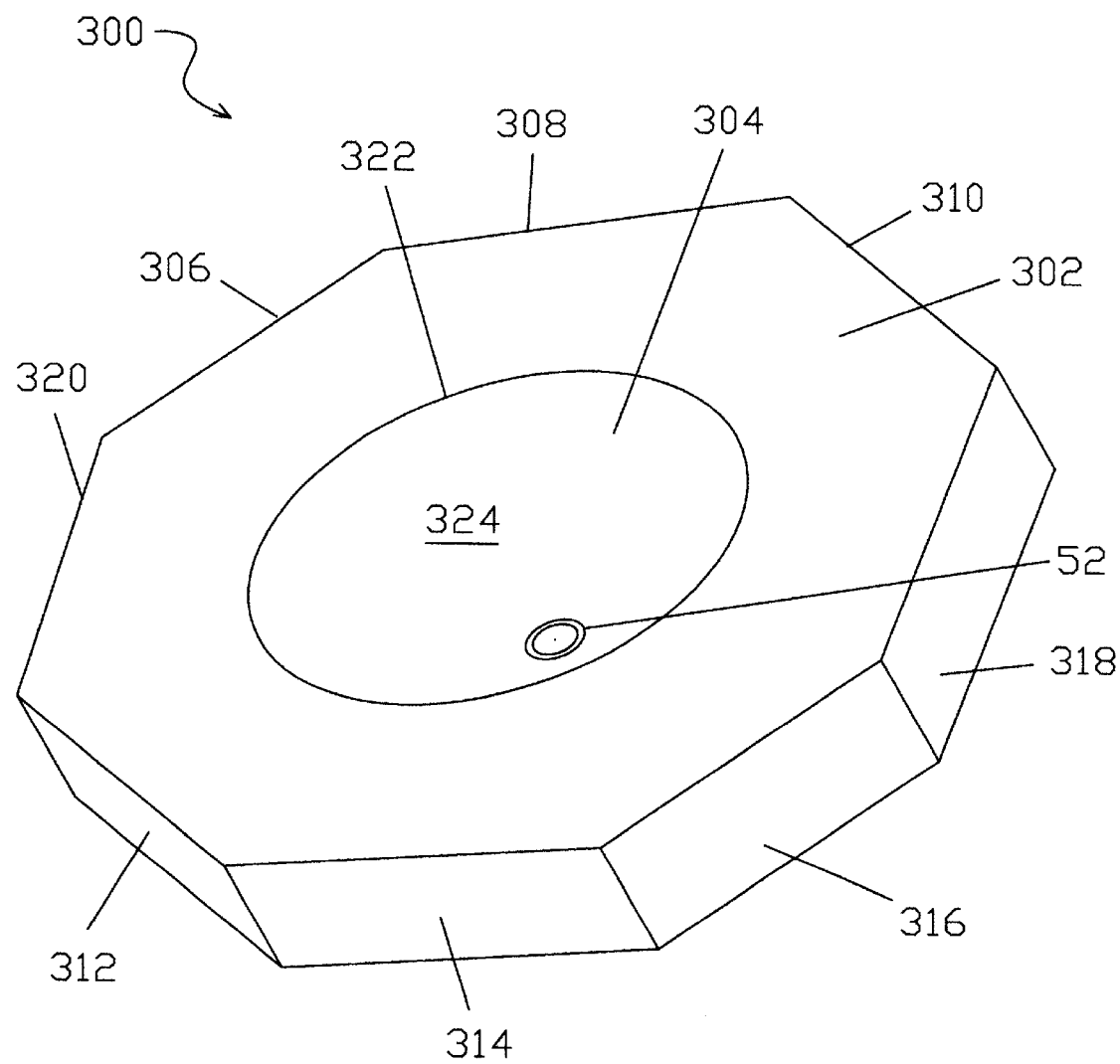
FIG. 9 is a perspective view of an example embodiment of the present invention.
Figure 10:
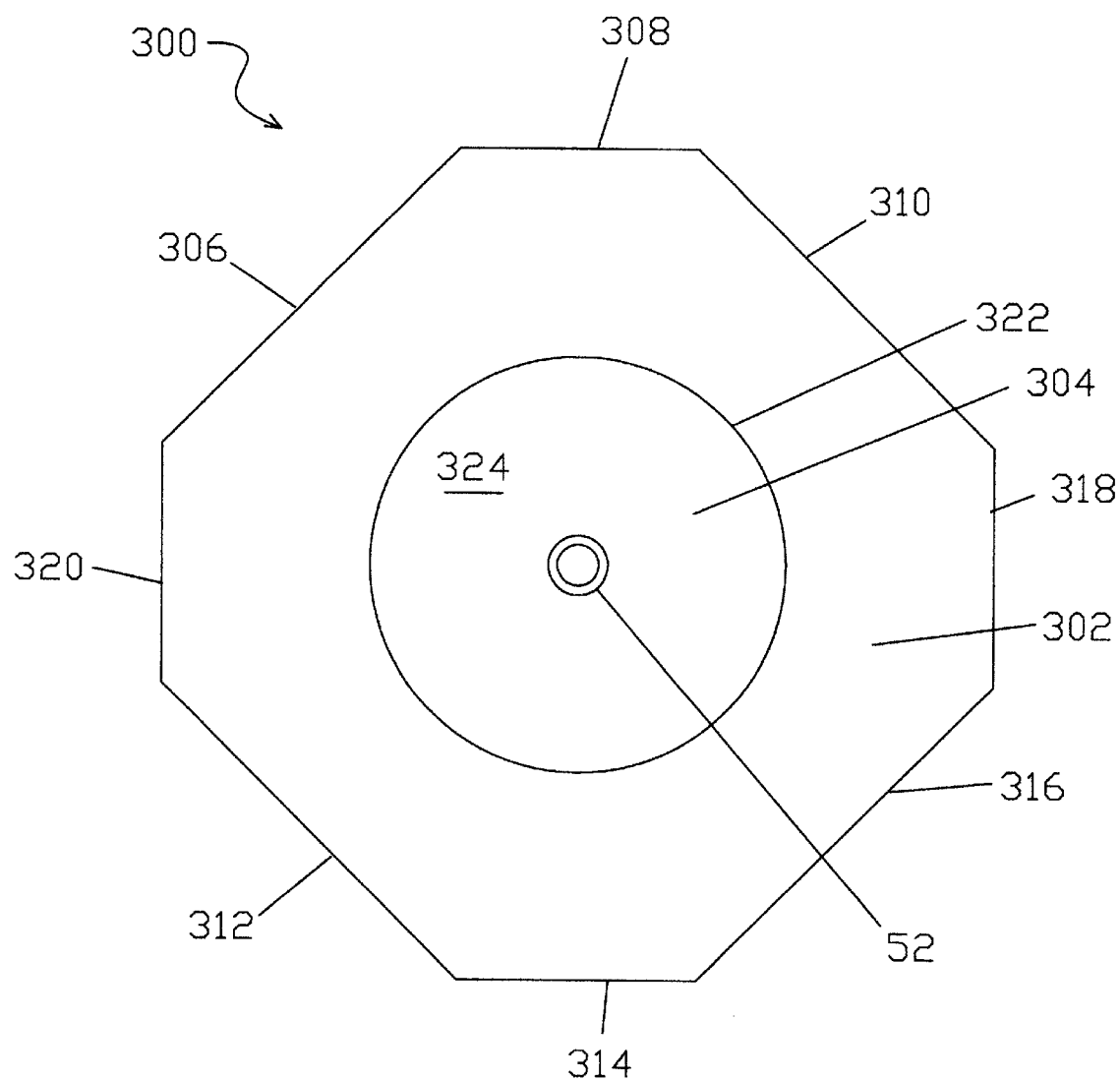
FIG. 10 is a top view of the example embodiment of the present invention shown in FIG. 9.
Figure 11:
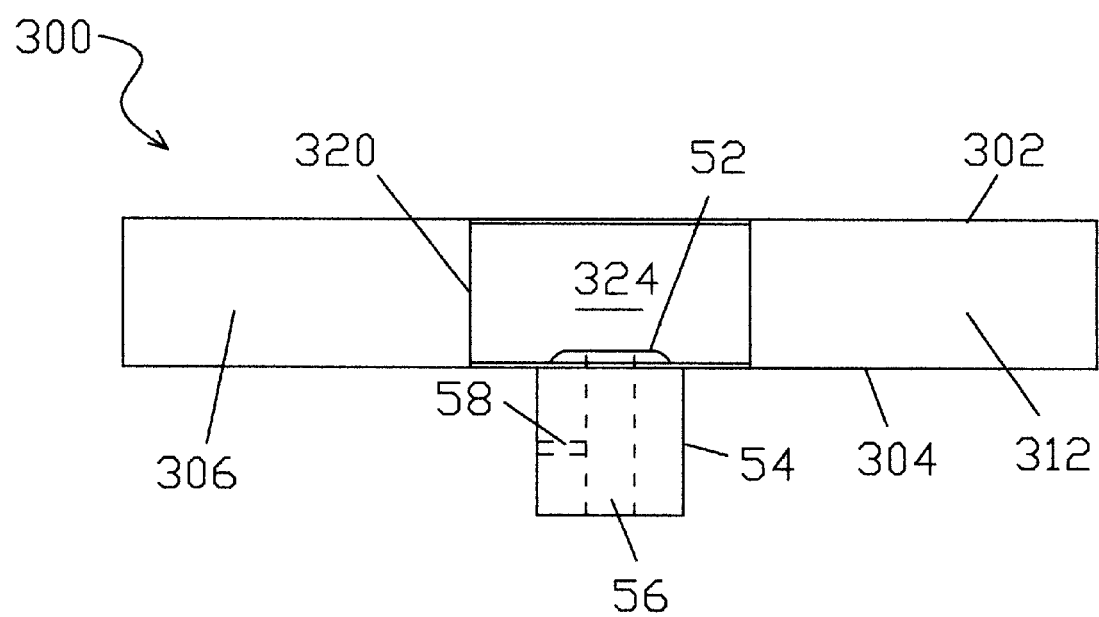
FIG. 11 is an end view of the example embodiment of the present invention shown in FIG. 9.

An additional exemplary embodiment of the spinner unit 300 of the present invention is shown in FIGS. 9–11 to have a housing top 302, bottom 304, and six sides 306, 308, 310, 312, 314, 316 that join to enclose an interior 324 through which feed enters from the feed storage unit discharge tube 18, through housing top inlet 322. In this exemplary embodiment 300, the sides are substantially perpendicular to the housing top 302, and the housing top and bottom are substantially octagonal when viewed in a plane perpendicular to the shaft 14 and parallel to the ground surface 22. The housing top, bottom and two of the six sides 310,316 define a housing first opening 318, while the housing top, bottom and another two of the six sides 306,312 define a housing second opening 320. When the spinner unit 300 is spun by the shaft 14, the two sides 310,316 adjacent the first opening 318 cause the feed to be discharged through first opening 318 in a jetted fashion. The feed is similarly directed by the sides 310,312 adjacent the second opening 320 through the second opening.

In the exemplary embodiment of the spinner unit 300 the inlet 322 is approximately 2.5 inches (64 millimeters) and the feed storage unit discharge tube 18 outer diameter is approximately 1.875 inches (48 millimeters), thus the discharge tube is closely received by the inlet, with only an approximately 0.3125 inch (8 millimeter) opening about the circumference of the inlet.

Figure 12:
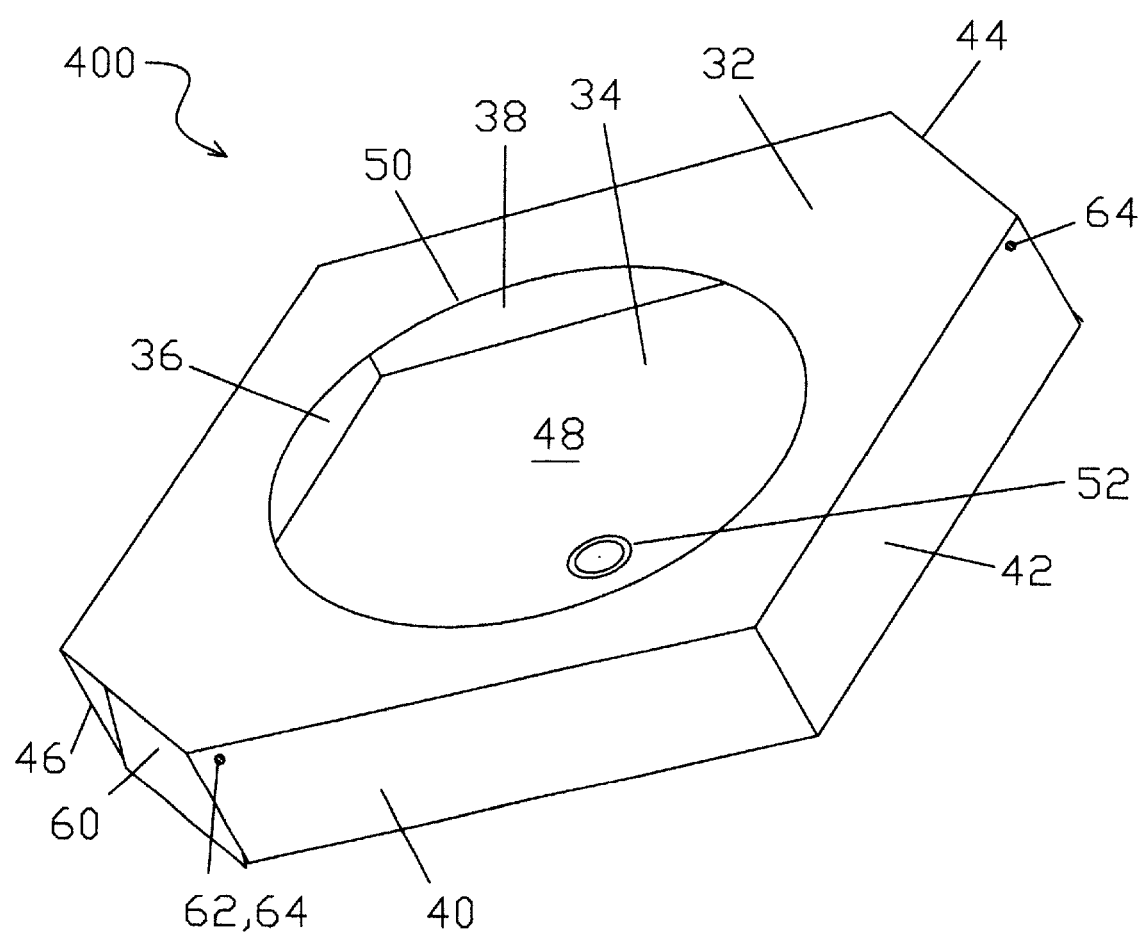
FIG. 12 is a perspective view of an example embodiment of the present invention.
Figure 12A:
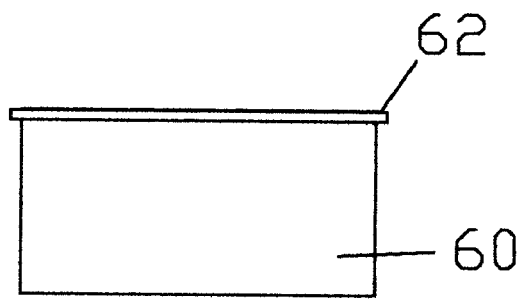
FIG. 12A is a front view of an opening cover on the example embodiment shown in FIG. 12.
Figure 13:
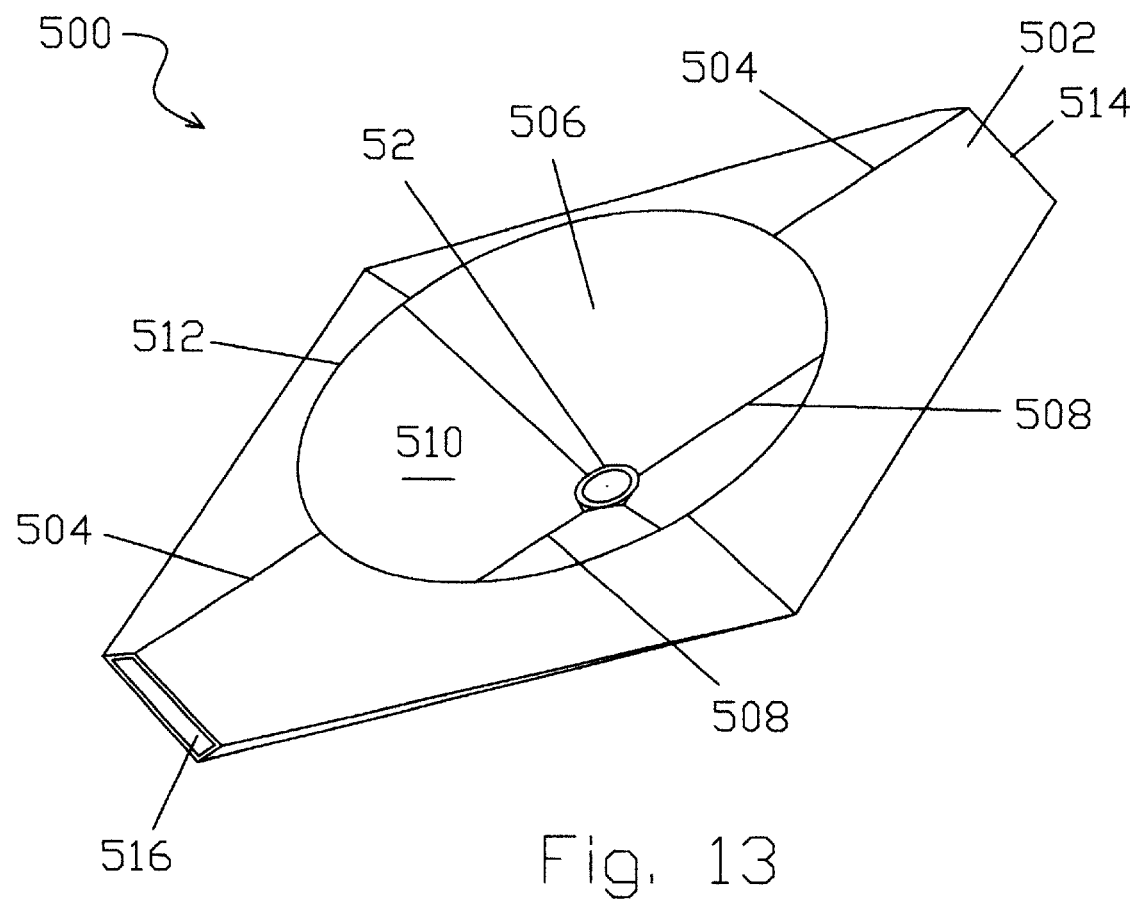
FIG. 13 is a perspective view of an example embodiment of the present invention.
Figure 14:
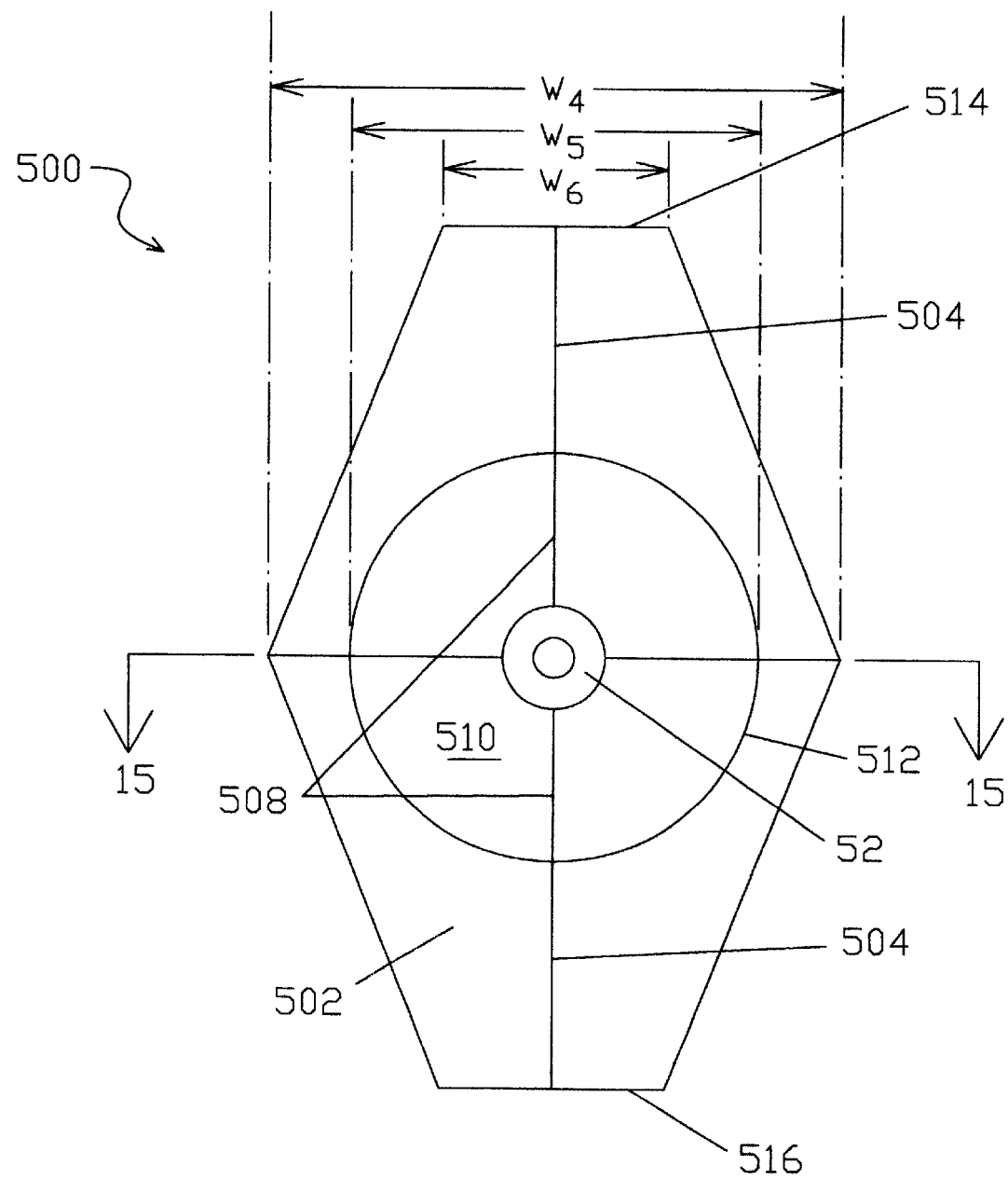
FIG. 14 is a top view of the example embodiment of the present invention shown in FIG. 13.

In another exemplary embodiment of the spinner unit 400, as shown in FIGS. 12–12A, a housing similar to that shown in FIG. 1, including a first and second opening, also includes a cover 60 for each opening. The cover has pins 62 that are received for hinged rotation by holes 64 in the sides 36,40, 38,42. The holes are set back from openings 44,46 such that when lifted, the covers are prevented from rotating over backwards and on to the housing top 32. Also, the height of the cover causes a small cover portion to extend beyond the housing bottom 34 when the cover is closed, as shown in FIG. 12. This prevents the covers from rotating inwardly toward the housing interior 48. When the spinner unit 400 is stationary, gravity pulls the covers to a closed position, preventing access to feed by birds. When the control unit shaft 14 rotates and spins the spinner unit 400 centrifugal force opens the covers, allowing the feed to be discharged through the openings.

Turning now to FIGS. 13–16, an additional exemplary embodiment of the spinner unit 500 of the present invention is shown to have a housing top 502 joined to a housing bottom 506 to enclose an interior 510 and form a first opening 514 and a second opening 516. The housing top has an inlet 512 for receiving feed from the feed storage unit discharge tube 18. Aligned with a longitudinal axis running from the first opening to the second opening are a housing top apex 504 and a housing bottom apex 508.

Figure 15:
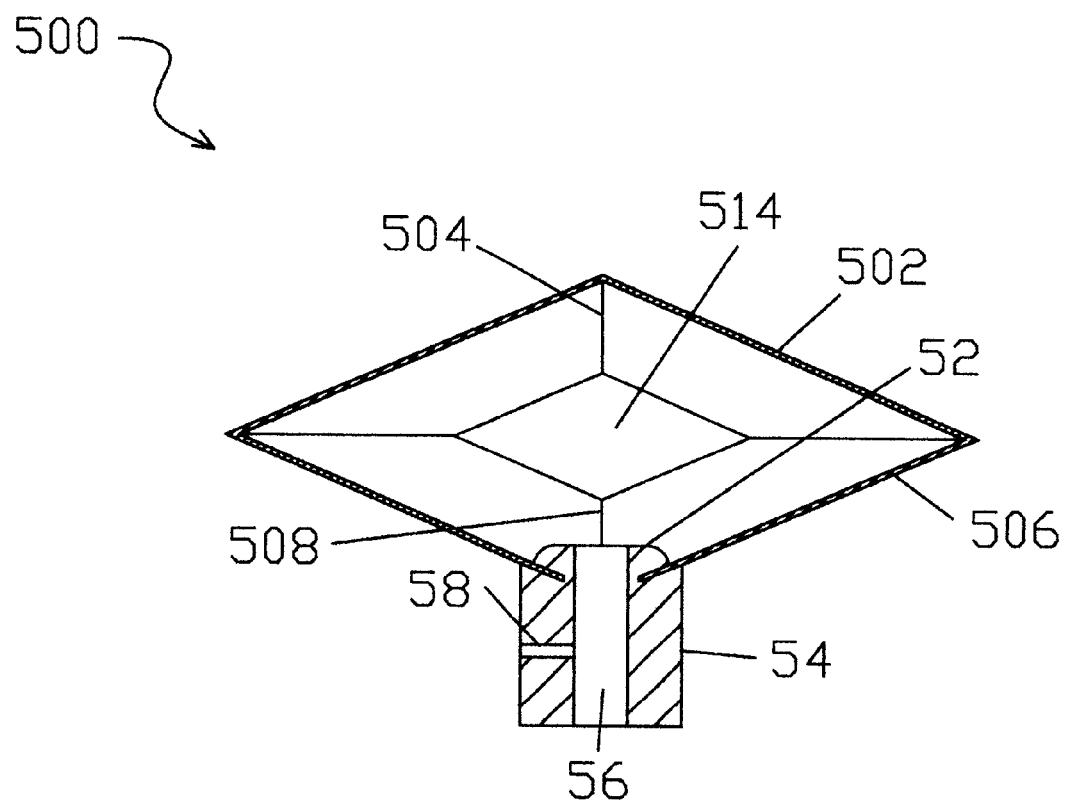
FIG. 15 is a sectional view taken along cutting plane 14—14 on FIG. 14.
Figure 16:
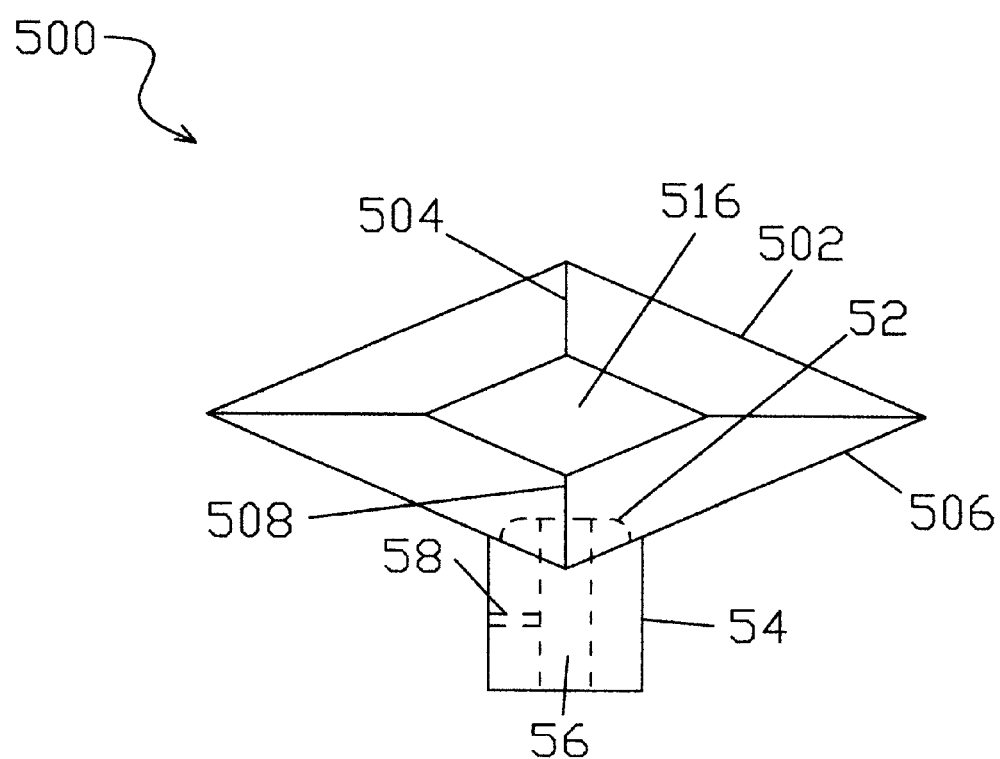
FIG. 16 is an end view of the example embodiment of the present invention shown in FIG. 13.

FIG. 15 is a sectional view of spinner unit 500 taken along a cutting plane lying on the maximum horizontal transverse width $W_4$ measured at the inlet 512. The inlet has a maximum horizontal transverse width $W_5$. The maximum housing width $W_4$ is greater than the housing first opening 514 maximum horizontal width $W_6$, the width $W_6$ also being the width of the housing second opening 516. For this exemplary embodiment of the spinner unit 500, width $W_4$ is approximately 3.5 inches (89 millimeters), width $W_5$ is approximately 2.5 inches (64 millimeters), and width $W_6$ is approximately 1.375 inches (35 millimeters).

In such an embodiment, the spinner unit 500 receives feed from the feed storage unit discharge tube 18, through the inlet 512, and into the housing interior 510. The received feed is deposited within the interior along the housing bottom 504 toward the first and second openings 514 and 516. The housing top 502 covers the received feed proximate the first and second openings and the feed lying on the housing bottom between the openings 514,516 and the edge of the inlet 512. The inlet typically has a diameter of approximately 2.5 inches (64 millimeters) and the feed storage unit discharge tube 18 typically has an outer diameter of approximately 1.875 inches (48 millimeters), thus the discharge tube is closely received by the inlet. This leaves a circumferential opening of approximately 0.3125 inch (8 millimeters) between the inlet edge and the discharge tube 18.

As the control unit shaft 14 spins the spinner unit 500, the feed in the interior is forced by centrifugal force through the first and second openings in a jetted fashion due to the taper of the housing top and bottom toward each opening. The extensive covering provided by the inlet sizing and the housing top prevents feed from being thrown upwardly from the spinner unit 500. When the spinner unit 500 is stationary, this covering prevents birds from eating from the top of the spinner unit 500, and, as can be seen on FIG. 15, the reduced area of the openings 514,516, prevents birds from inserting their heads through the openings to gain access to the received feed.

Figure 17:
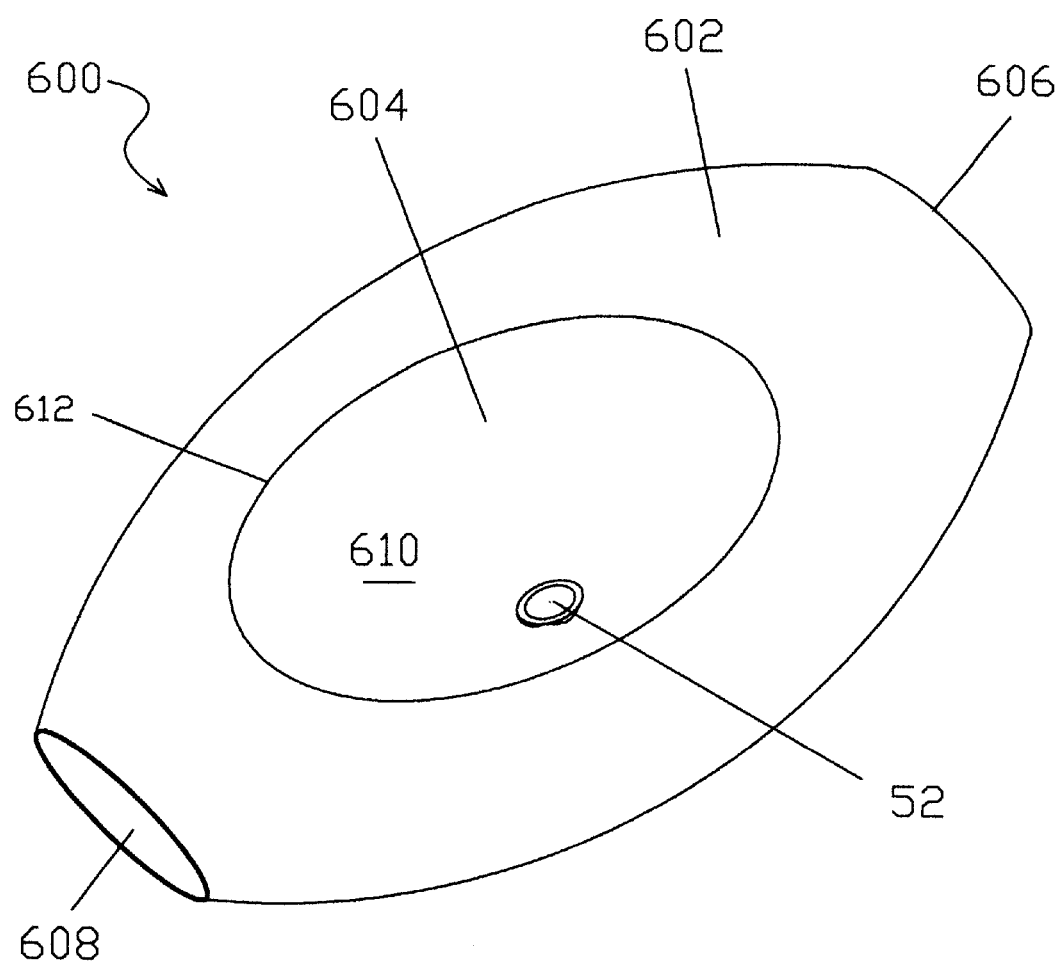
FIG. 17 is a perspective view of an example embodiment of the present invention.
Figure 18:
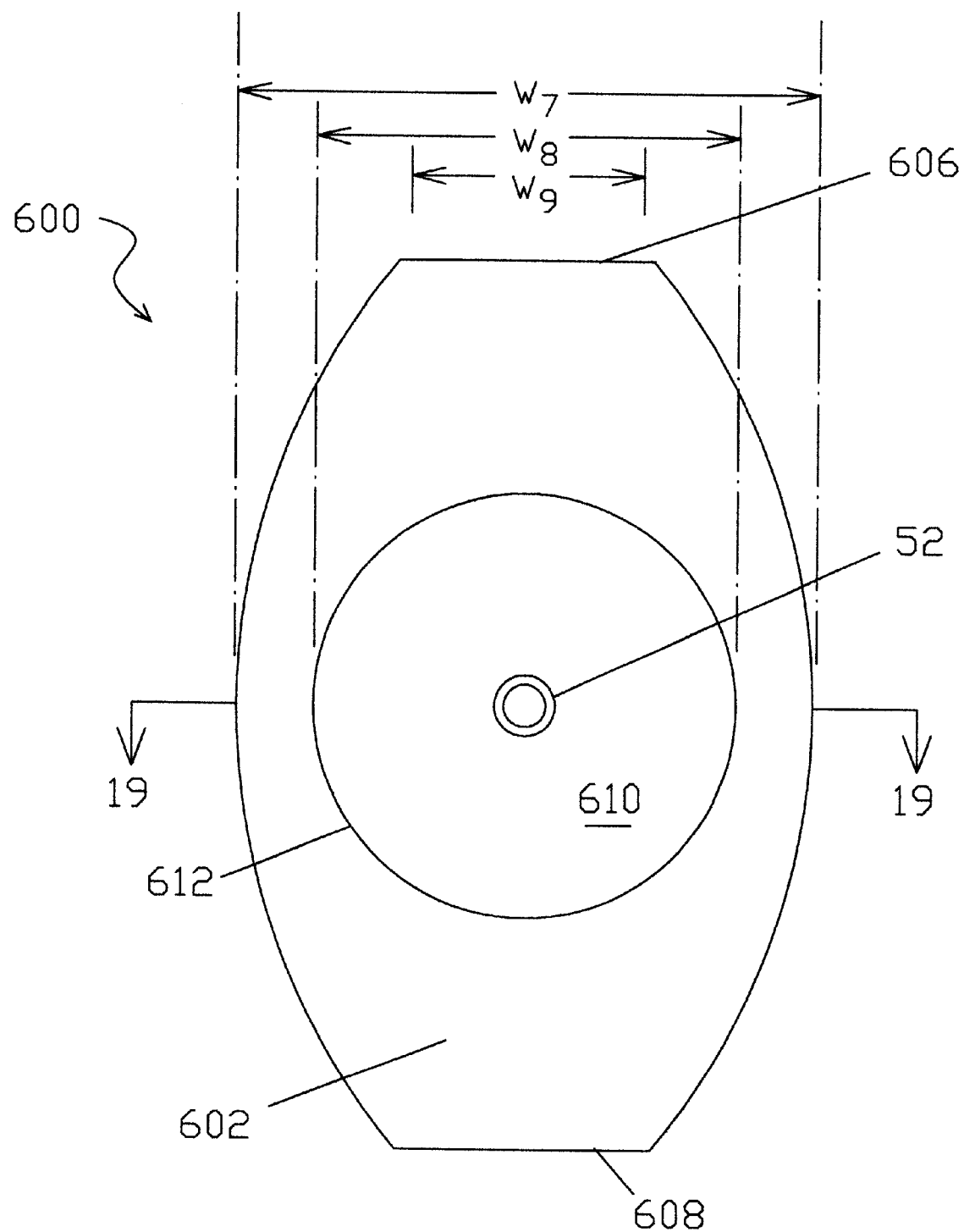
FIG. 18 is a top view of the example embodiment of the present invention shown in FIG. 17.
Figure 19:
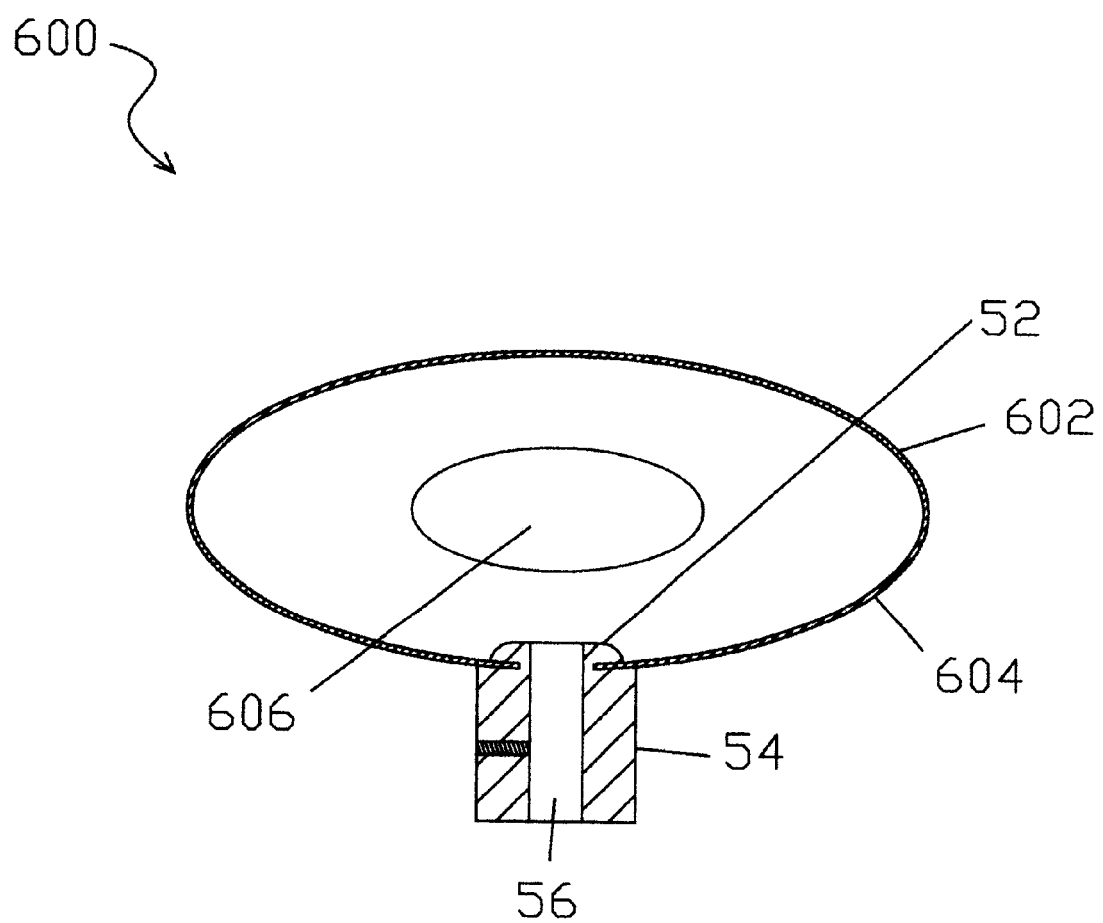
FIG. 19 is a sectional view taken along cutting plane 19—19 on FIG. 18.
Figure 20:
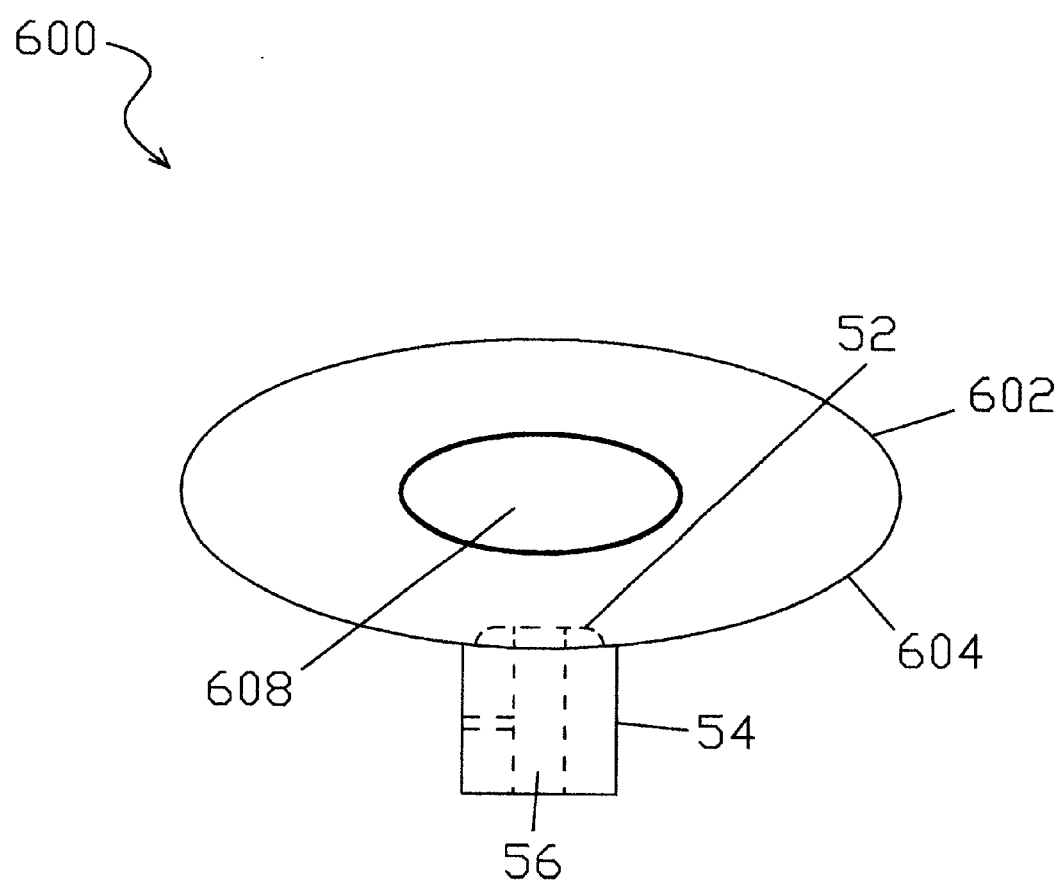
FIG. 20 is an end view of the example embodiment of the present invention shown in FIG. 17.

An additional embodiment of the spinner unit 600 of the present invention is illustrated in FIGS. 17–19. This embodiment includes a housing top 602 and housing bottom 604, both shown to be curved when sectionally viewed at a cutting plane through the housing's maximum horizontal transverse width $W_7$ measured at a housing inlet 612, as shown in FIGS. 18–19. The housing top and bottom join to enclose an interior 610 and form a first opening 606 and second opening 608. The feed from the feed storage unit discharge tube 18 enters the interior 610 through the inlet 612, the inlet having a maximum horizontal transverse width $W_8$. The housing first and second openings 606,608 have a maximum horizontal width $W_9$.

The maximum housing width $W_7$ is greater than the housing first opening 606 maximum horizontal width $W_9$. For this exemplary embodiment of the spinner unit 600, width $W_7$ is approximately 3.5 inches (89 millimeters), width $W_8$ is approximately 2.5 inches (64 millimeters), and width $W_9$ is approximately 1.375 inches (35 millimeters).

During use, the exemplary spinner unit 600 receives feed from the feed storage unit discharge tube 18 through the housing inlet 612 into the housing interior 610. The inlet typically has a diameter of approximately 2.5 inches (64 millimeters) and the feed storage unit discharge tube 18 typically has an outer diameter of approximately 1.875 inches (48 millimeters), thus the discharge tube is closely received by the inlet. This leaves a circumferential opening of approximately 0.3125 inch (8 millimeters) between the inlet edge and the discharge tube 18. Due to the extensive covering of the housing interior by the housing top, and the small circumferential opening around the discharge tube, very little feed is thrown upwardly through the inlet when the spinner unit 600 is spinning. When the unit 600 is stationary, birds are effectively denied access to the housing interior feed and are prevented from thieving feed. As shown in FIG. 19, the reduced area of the openings 606,608 prevents birds from inserting their heads through the opening to eat feed from within the interior.

Figure 21:
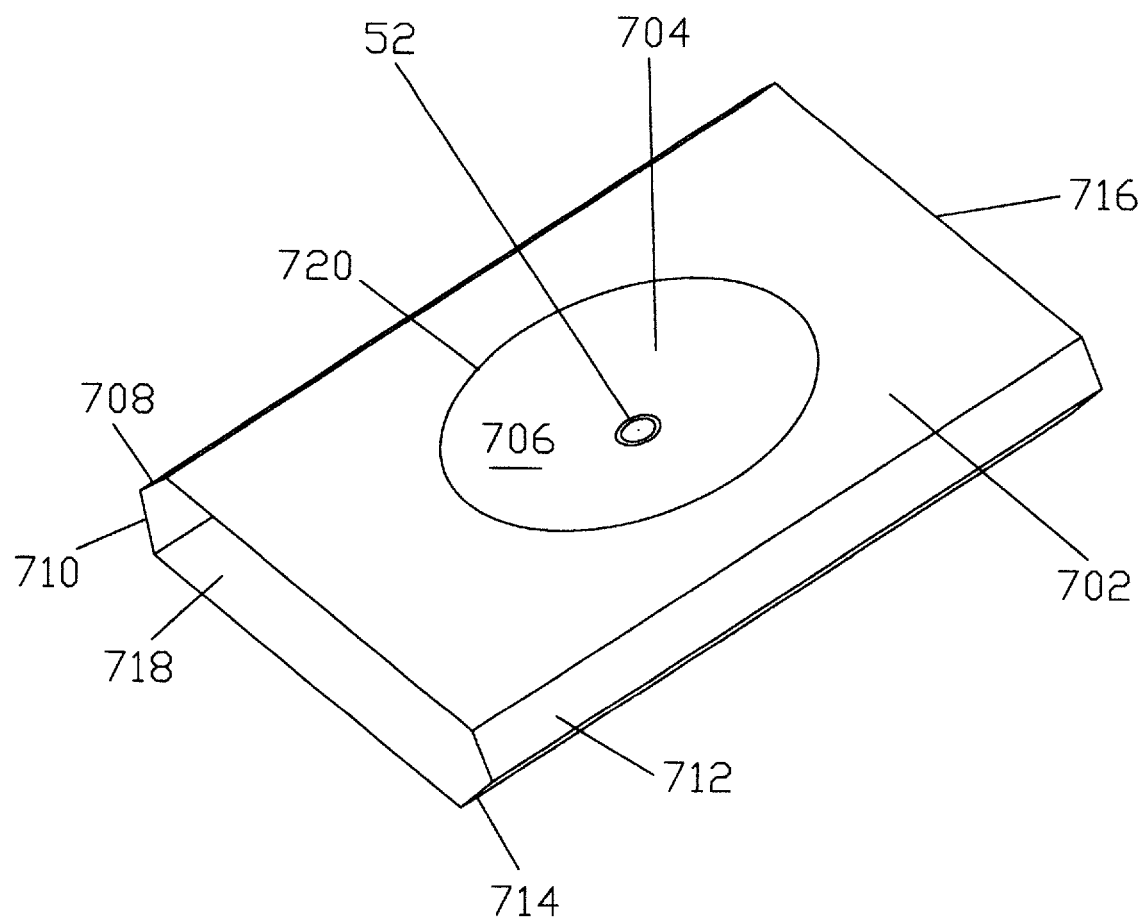
FIG. 21 is a perspective view of an example embodiment of the present invention.
Figure 22:
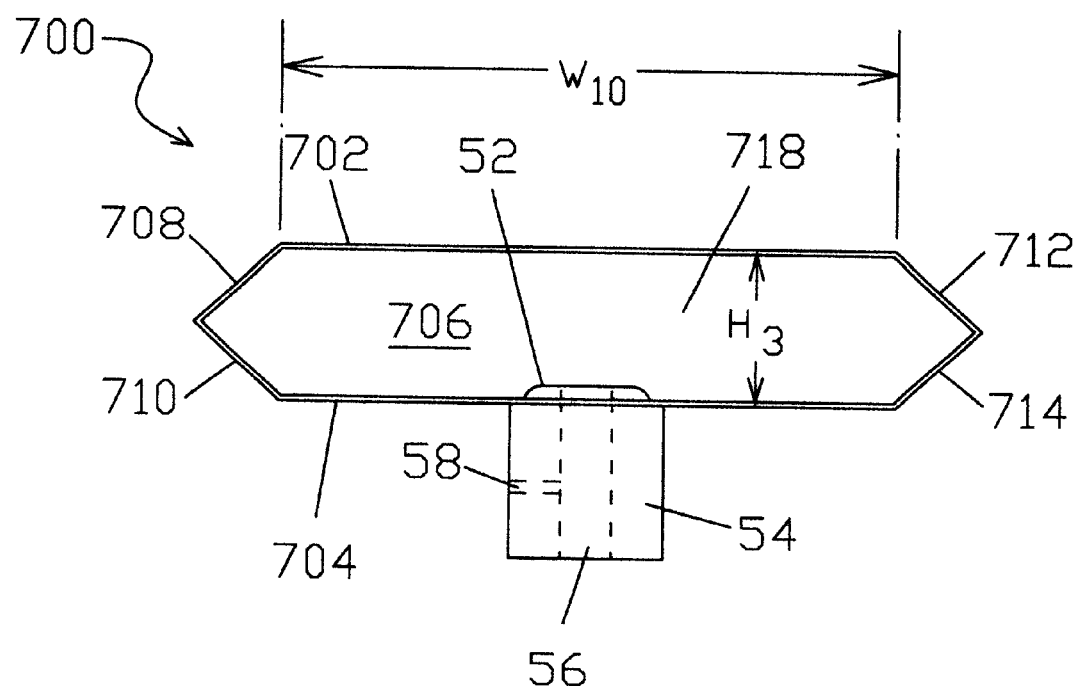
FIG. 22 is an end view of the example embodiment of the present invention shown in FIG. 21.
Figure 23:
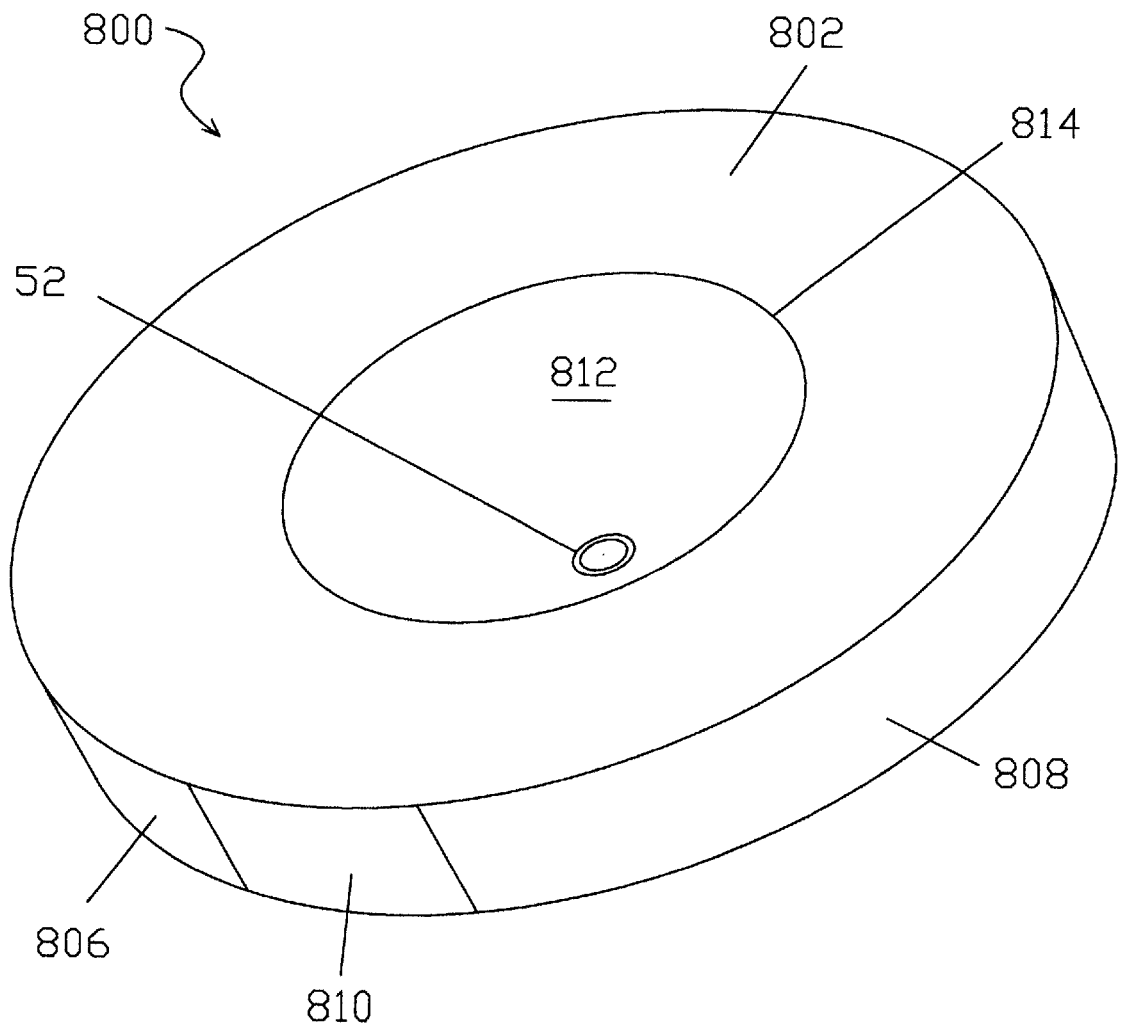
FIG. 23 is a perspective view of an example embodiment of the present invention.
Figure 24:
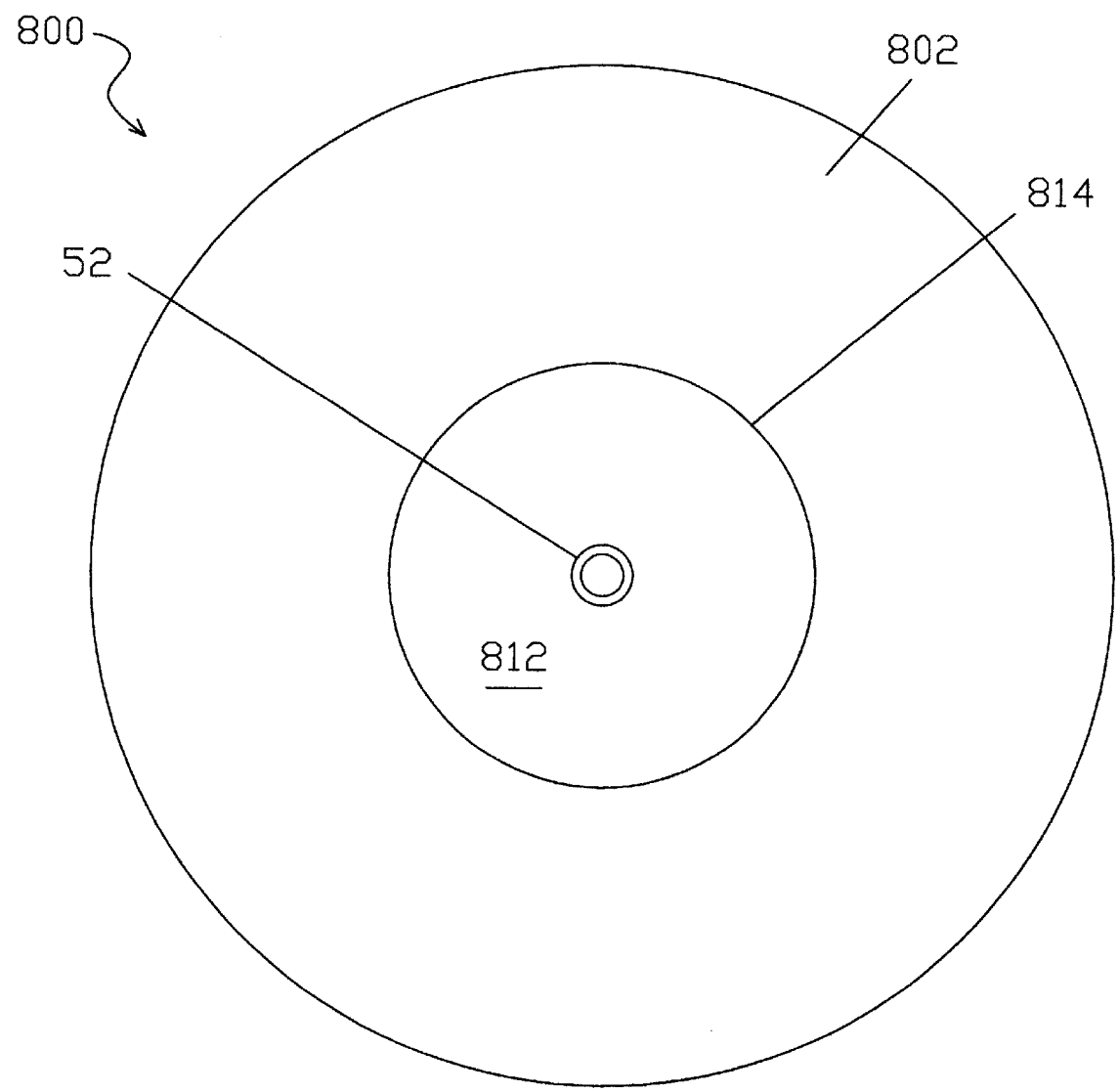
FIG. 24 is a top view of the example embodiment of the present invention shown in FIG. 23.
Figure 25:
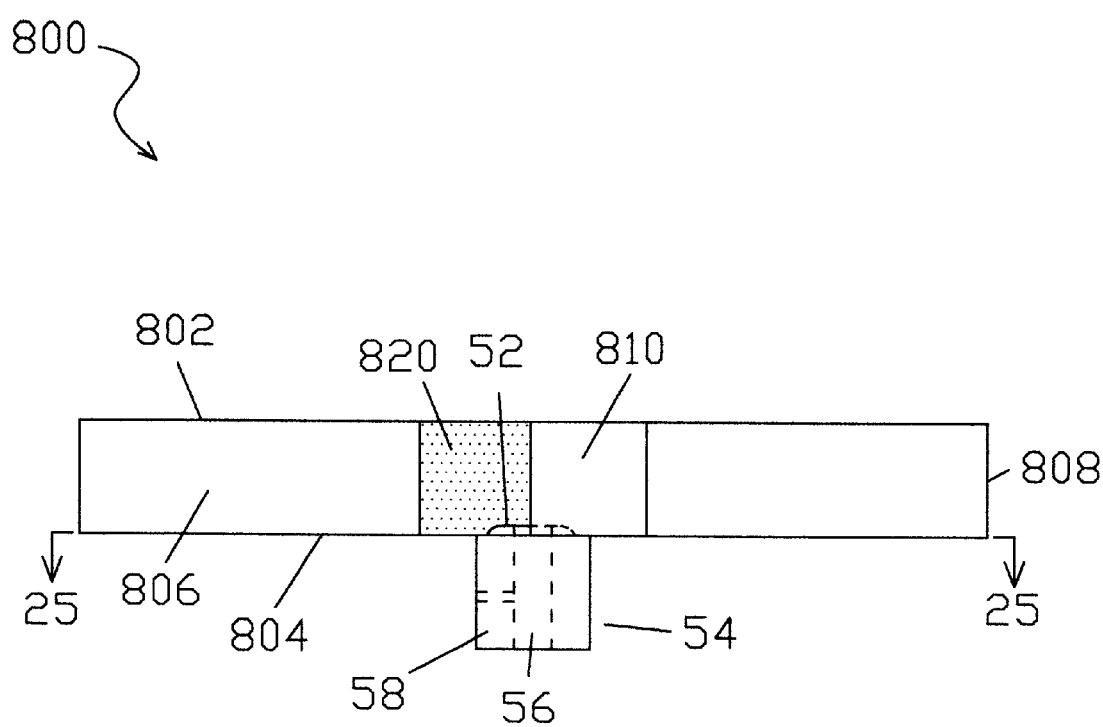
FIG. 25 is an end view of the example embodiment of the present invention shown in FIG. 23.
Figure 26:
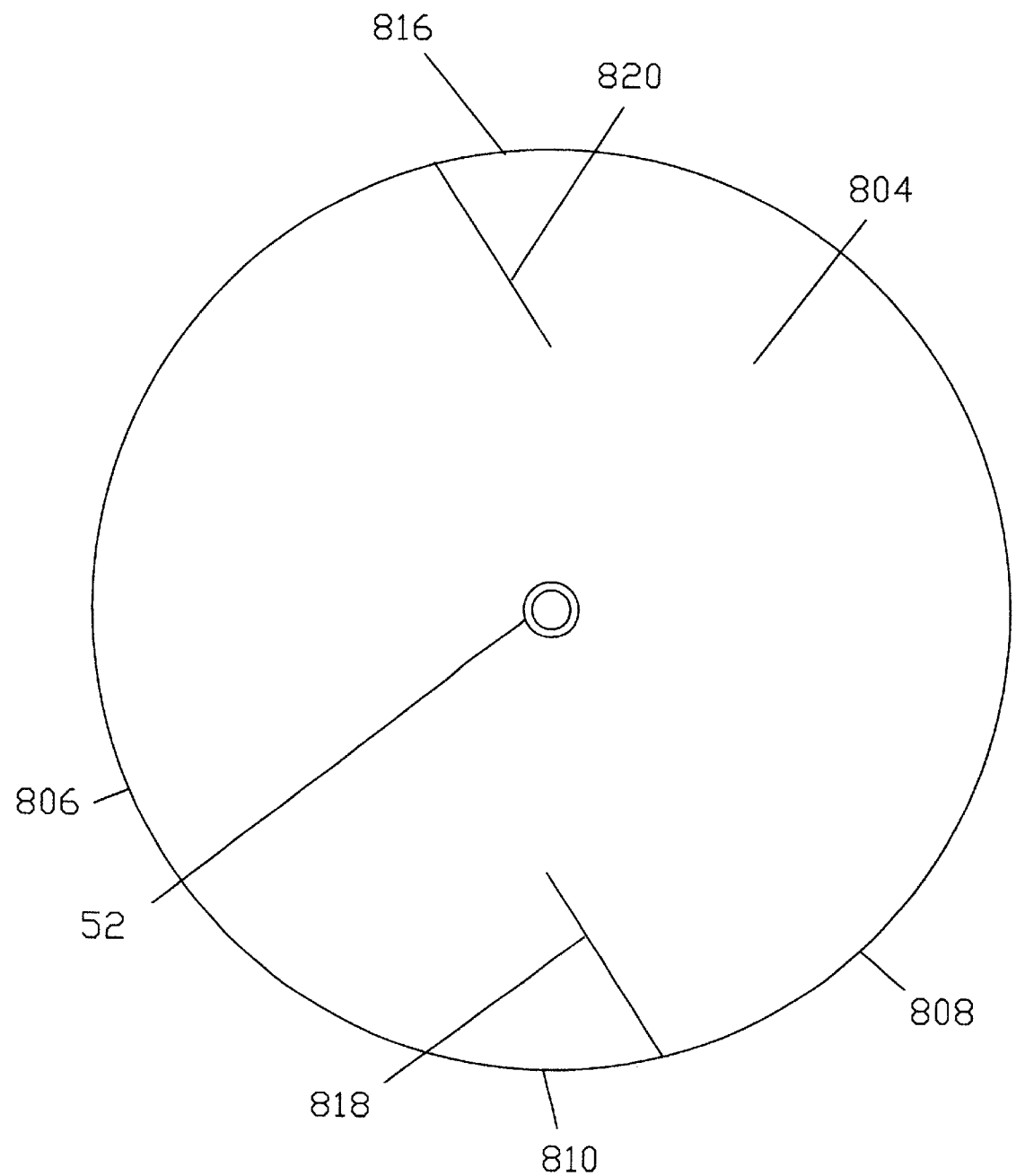
FIG. 26 is a top view of the example embodiment of the present invention shown in FIG. 23, with the housing top removed to reveal interior guides.

FIGS. 21–22 depict an additional exemplary embodiment of a spinner unit 700 of the present invention having a housing top 702 and bottom 704, and four sides 708,710, 712,714 joining the housing top and bottom to enclose an interior 706 and form a first opening 716 and second opening 718. The housing top has an inlet 720 for receiving feed from the feed storage unit discharge tube 18. The end view of FIG. 22 illustrates the polygonal shape of the opening 718 as defined by the top, bottom and four sides. The openings 716,718 have a maximum height $H_3$ that is smaller than the maximum horizontal transverse width $W_{10}$ of the housing top. In a typical application, height $H_3$ is approximately 0.75 inches (19 millimeters) and width $W_{10}$ is approximately 3 inches (76 millimeters). The top covers received feed in the portions of the interior 706 lying between the edge of the inlet 720 and the openings 716,718, thus preventing feed from being thrown upwardly while the spinner unit 700 is being spun, and interfering with birds attempting to eat feed lying on the housing bottom 704. The relative height of the openings to the housing top width $W_{10}$ prevents birds from inserting their heads into the openings to eat feed, when the spinner unit 700 is stationary.

Turning now to FIGS. 23–26, an additional embodiment of a spinner unit 800 of the present invention is shown to have a generally circular-shaped housing top 802 and bottom 804 when viewed in a plane substantially perpendicular to the control unit shaft 14 and substantially horizontal to the ground surface 22. The housing top and bottom are joined by two sides 806,808 to enclose an interior 812, and form a first opening 810 and a second opening 816. The second opening is diametrically opposed to the first opening 810 on the circumference of the circular profile of the housing top. Feed is received from the feed storage unit discharge tube 18 through a housing inlet 814 into the housing interior 812.

In this exemplary embodiment of the spinner unit 800, substantially upright and planar feed guides 818,820 are positioned adjacent the first opening and second opening, respectively. The guides extend from the housing top to the housing bottom, and as the spinner unit 800 is spun in a clockwise direction, feed sliding with respect to the housing bottom encounters the guide 818, slides along the guide, and is discharged through the first opening 810. Similarly, feed encountering the guide 820 slides along the guide and is forced from the interior through the second opening at reference 816 on FIG. 26.

The housing top 802 covers received feed lying in interior portions between the edge of the inlet 814 and the first and second openings. This is very effective in preventing bird access to feed lying on the housing bottom 804. As in the embodiment shown in FIG. 3, this extensive covering configuration, and the relatively close receipt of the feed storage unit discharge tube 18 in the inlet 814, prevents received feed from being thrown up and off of the spinner unit 800 while being spun on the shaft 14.

Figure 27:
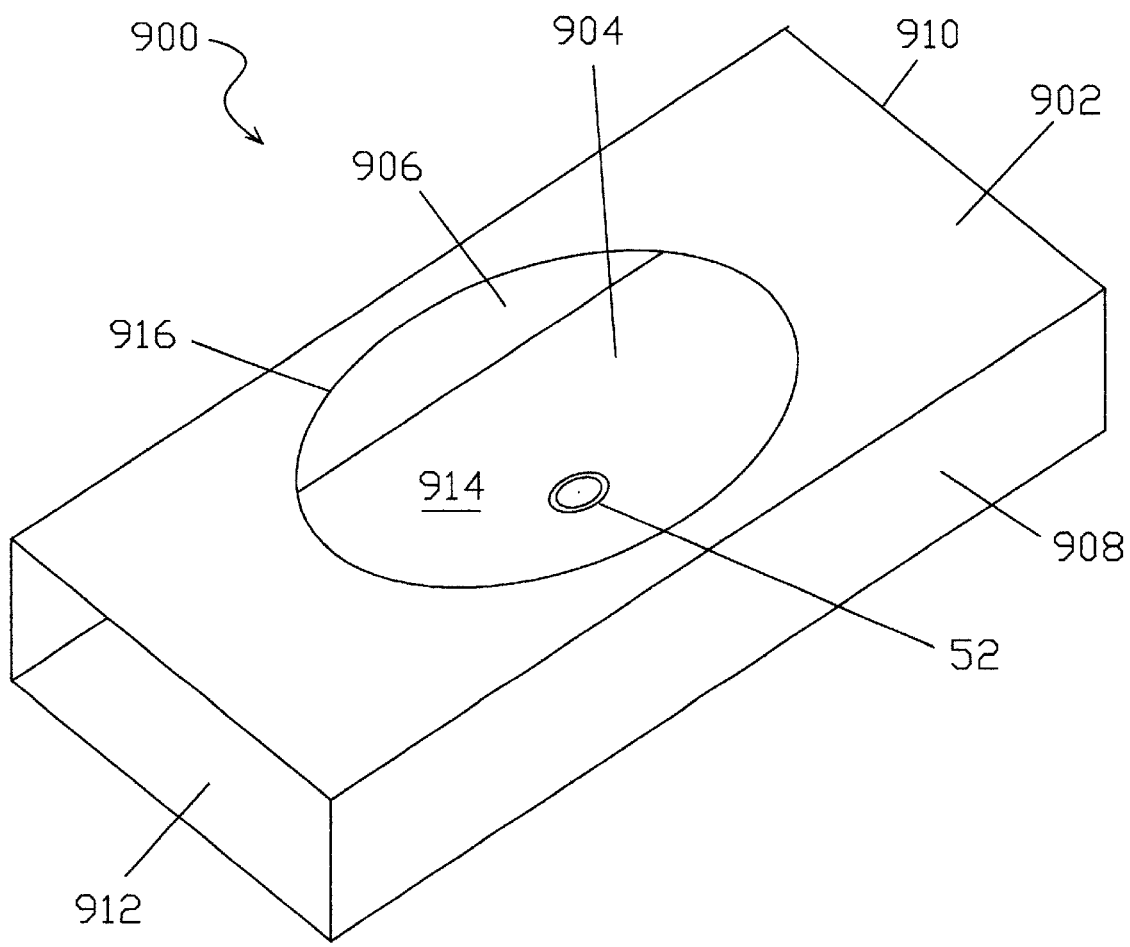
FIG. 27 is a perspective view of an example embodiment of the present invention.
Figure 28:
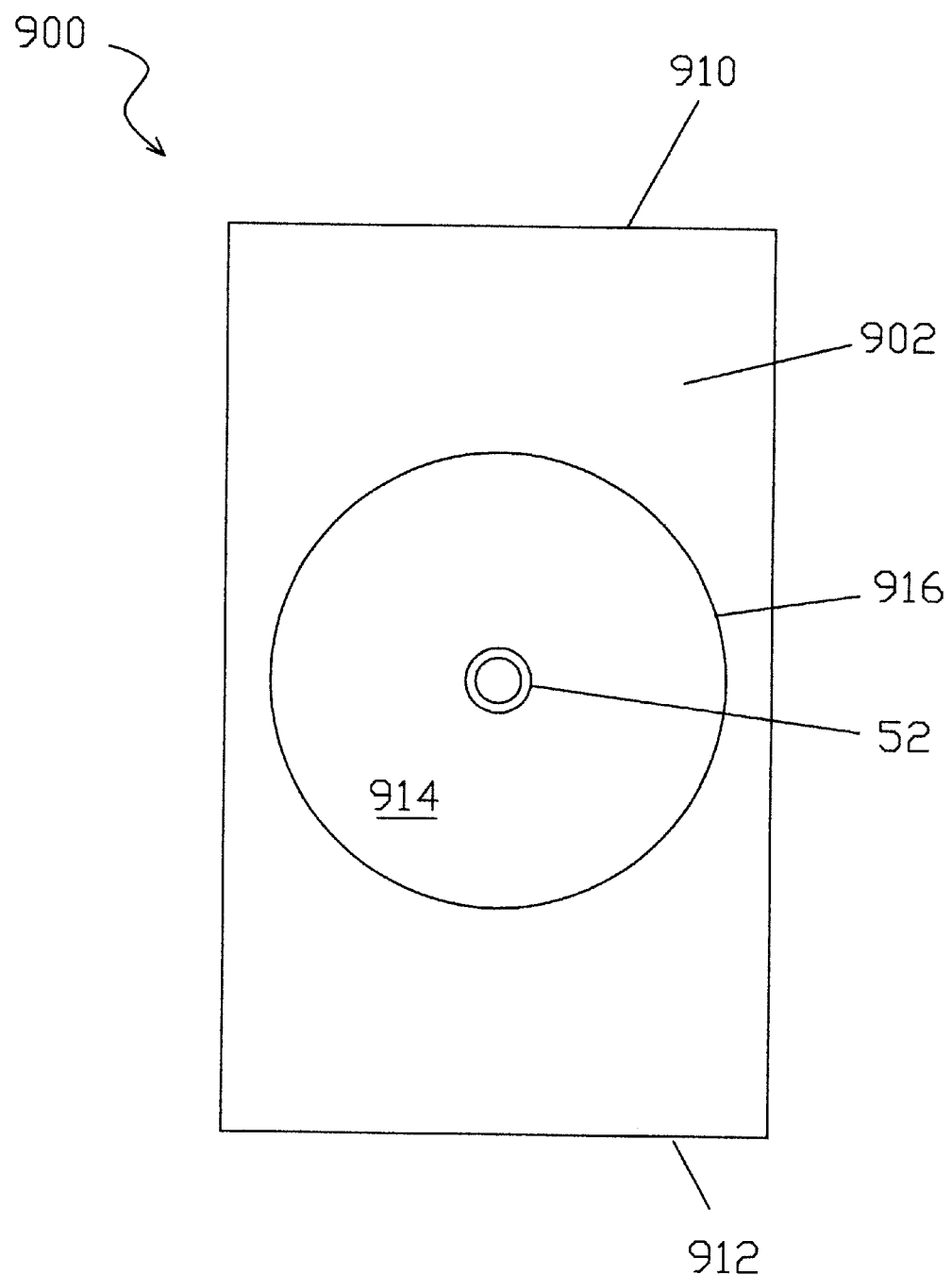
FIG. 28 is a top view of the example embodiment of the present invention shown in FIG. 27.
Figure 29:
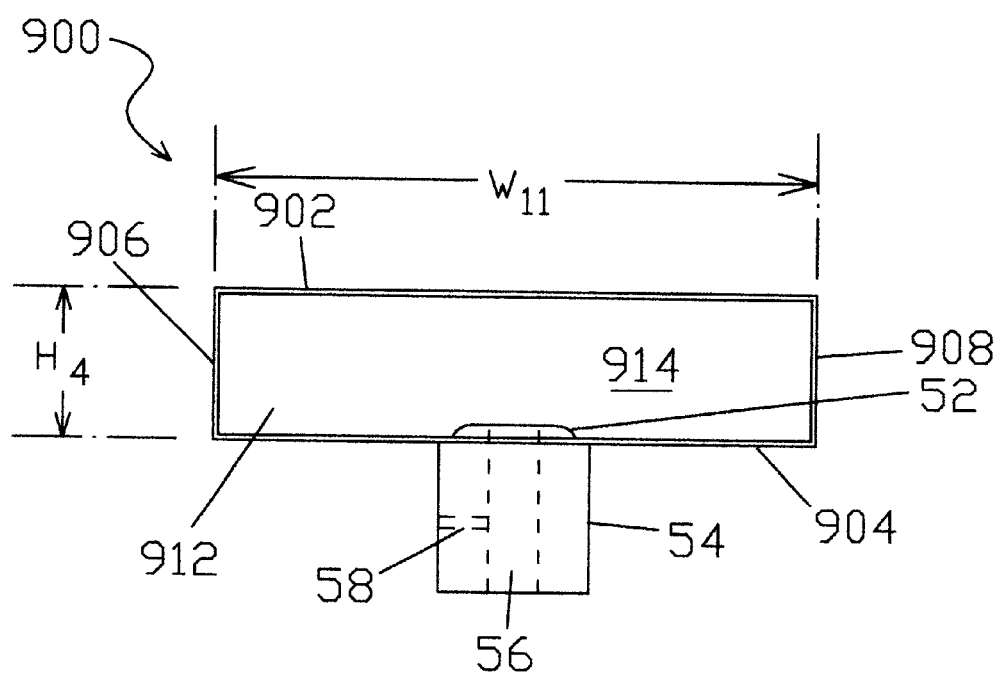
FIG. 29 is an end view of the example embodiment of the present invention, shown in FIG. 27.

An additional embodiment of a spinner unit 900 according to the present invention is illustrated in FIGS. 27–29. A housing top 902 and housing bottom 904 are joined by two substantially straight sides 906,908 to enclose an interior 914, and form a housing first opening 910 and a second opening 912. The housing top is substantially perpendicular to the sides. A housing top inlet 916 receives feed from the feed storage unit discharge tube 18 into the housing interior 914. In this exemplary embodiment, and as shown in FIG. 29, the sides have a height $H_4$, and the housing top has a maximum transverse width $W_{11}$, the height $H_4$ being less than the width $W_{11}$. In a typical application, height $H_4$ is approximately 0.75 inches (19 millimeters) and width $W_{11}$ is approximately 3 inches (76 millimeters). The housing top covers received feed in the portions of the interior 914 lying between the edge of the inlet 916 and the openings 910,912. The relative height of the openings to the housing top width prevents birds from inserting their heads into the openings to eat feed, when the spinner unit 900 is stationary. Similarly, birds are prevented from eating from feed lying on the housing bottom 904 by the extensive covering provided by the housing top 902 and the close receipt of the feed control unit discharge tube 18 by the housing inlet 916.

Figure 30:
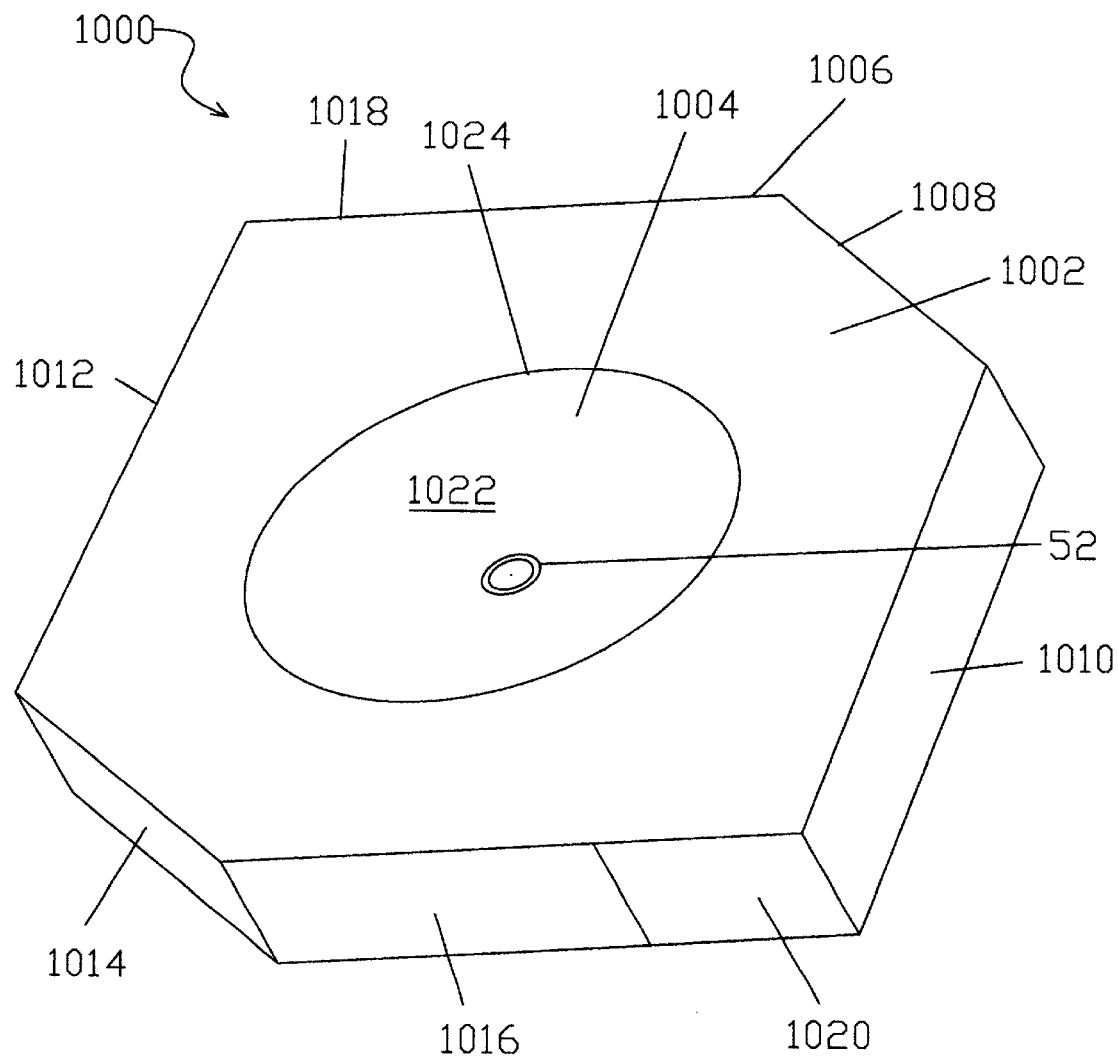
FIG. 30 is a perspective view of an example embodiment of the present invention.
Figure 31:
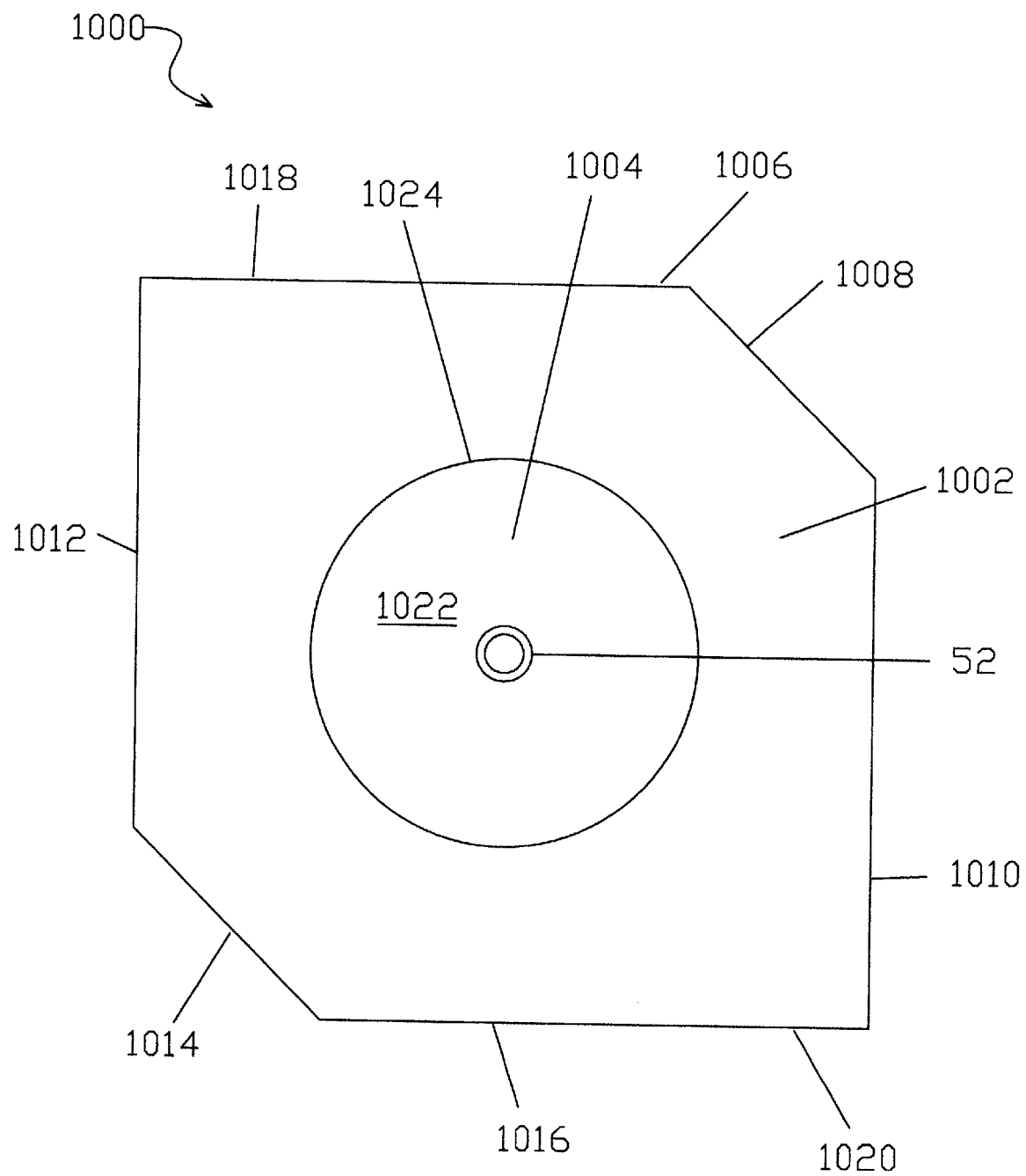
FIG. 31 is a top view of the example embodiment of the present invention shown in FIG. 30.

FIGS. 30–31 illustrate an additional exemplary embodiment of the spinner unit 1000 of the present invention. This embodiment has a housing top 1002, bottom 1004, and sides 1006, 1008, 1010, 1012, 1014, 1016 that join to enclose an interior 1022 through which feed enters from the feed storage unit discharge tube 18, through housing top inlet 1024. In this exemplary embodiment 1000, the sides are substantially perpendicular to the housing top 1002, and the housing top and bottom are substantially hexagonal when viewed in a plane perpendicular to the shaft 14 and parallel to the ground surface 22. The housing top, bottom and two of the six sides 1010,1016 define a housing first opening 1020, while the housing top, bottom and another two of the six sides 1006,1012 define a housing second opening 1018. The extensive enclosure configuration provided by the housing top, sides and bottom, prevent small animal access to the feed within the interior.

In the exemplary embodiment of the spinner unit 1000 the inlet 1024 is approximately 2.5 inches (64 millimeters) and the feed storage unit discharge tube 18 outer diameter is approximately 1.875 inches (48 millimeters), thus the discharge tube is closely received by the inlet, with only an approximately 0.3125 inch (8 millimeter) opening about the circumference of the inlet.

With respect to the above description then, it is to be realized that the optimum material and dimensional relationships for the parts of the spinner units will include variations in size and materials which will occur to those skilled in the art upon review of the present disclosure. For example, in various embodiments the spinner units are constructed from various metals, woods, and plastics, and can be attached to the control unit shaft using typical attachment devices known in the art, including, but not limited to clamps, welding, and squeeze fitting a collar onto the shaft, wherein the fit is sufficiently tight to retain the collar. Similarly, the collar can be attached to the housing bottom using several methods known in the art, including, but not limited to, rivets, welding, screws or bolts through the housing bottom into a collar with a threaded portion, a threaded member on the collar through the housing bottom for threaded coupling with a nut in the housing interior, and other typical attachment methods. Furthermore, the inlet can be shaped to closely receive and accommodate variously shaped discharge tubes.

All equivalent relationships to those illustrated in the drawings and described in the specification are intended to be encompassed by the present invention.

It will be understood from the foregoing description that various modifications and changes may be made, and in fact will be made, in the exemplary embodiments of the present invention without departing from its true spirit. The descriptions in this specification are for purposes of illustration only and are not to be construed in a limiting sense. The scope of the present invention is limited only by the language of the following claims.

I claim:

1. A spinner for attachment to a substantially vertical rotating shaft of a control unit of a feeder, the control unit having a motor for rotating the shaft of a control unit of a feeder having feed storage unit for storing feed and discharging stored feed in a downward direction, the spinner unit comprising:

a housing having a top and a bottom, the top and bottom being joined to form a housing interior, and to further form a first opening and a second opening, the top having an inlet for receiving feed from the feed storage unit into the housing interior, the housing having a maximum horizontal transverse width at the inlet that Is greater than a maximum horizontal width of the housing at the first opening and a maximum horizontal width of the housing at the second opening, the top extending continuously, with decreasing transverse width, in a first direction from the inlet to the first opening, and in a second direction from the inlet to the second opening, the top and bottom enclosing received feed in the interior such that feed proximate the first and second openings is covered by the housing top; and a shaft attachment member for attaching the housing to the control unit rotating shaft, such that when the shaft rotates, the housing spins, and received feed is forced from the housing interior through the first and second openings.

2. The spinner unit of claim 1, wherein the housing top and bottom enclose received feed in the housing interior such that the top substantially covers received feed in the interior between the top inlet and the first opening, and in the interior between the top inlet and the second opening.

3. The spinner unit of claim 1, wherein the housing top and bottom join to form a plurality of sides between the first and second openings.

4. The spinner unit of claim 3, wherein the formed sides are substantially vertical.

5. The spinner unit of claim 1, wherein the housing top extends beyond the housing bottom proximate at least one of the first opening and the second opening.

6. The spinner unit of claim 1, further comprising a first opening cover attached to the housing for opening and closing over the first opening and a second opening cover attached to the housing for opening and closing over the second opening, the covers being attached such that the covers open when the housing is spinning, in response to centrifugal force.

7. The spinner unit of claim 1, wherein the feed storage unit has a discharge member through which the received feed is discharged from the feed storage unit, and the housing top inlet closely receives the discharge member.

8. The spinner unit of claim 1, wherein the housing has a longitudinal axis extending between the first and second openings, the housing top having an apex aligned with the longitudinal axis.

9. The spinner unit of claim 1, wherein the housing has a longitudinal axis extending between the first and second openings, the housing bottom having an apex aligned with the longitudinal axis.

10. The spinner unit of claim 1, wherein the housing has a longitudinal axis extending between the first and second openings, the housing top and bottom each having an apex aligned with the longitudinal axis.

11. The spinner unit of claim 1, wherein the housing top is curved.

12. The spinner unit of claim 1, wherein the housing bottom is curved.

13. The spinner unit of claim 1, wherein the housing top and bottom are curved.

14. A spinner unit for attachment to a substantially vertical rotating shaft of a control unit of a feeder, the control unit having a motor for rotating the shaft, the feeder having a feed storage unit for storing feed and discharging stored feed in a downward direction, the spinner unit comprising:

a housing having a top, a bottom, a plurality of sides, a first opening and a second opening, the top, bottom and sides being joined to form a housing interior, the top, bottom and side having a first end defining the first opening as a hexagon, the top, bottom and sides having a second end defining the second opening as a hexagon, the top extending continuously in a first direction from the inlet to the first opening, and in a second direction from the inlet to the second opening, and in a second direction from the inlet to the second opening, the first and second openings each having a height and width, the height of each such opening being less than the width of each such opening, the top having an inlet for receiving feed from the feed storage unit into the housing interior, the top, sides and bottom enclosing received feed in the interior such that received feed proximate the openings is covered by the hosing top; and a shaft attachment member for attaching the housing to the control unit rotating shaft, such that, when the shaft rotates, the housing spins, and received feed is forced from the housing interior through the openings.

15. The spinner unit of claim 14, wherein the housing top and bottom enclose received feed in the housing interior such that the top substantially covers received feed in the interior between the top inlet and the first opening, and in the interior between the top inlet and the second opening.

16. The spinner unit of claim 14, wherein the number of sides is four and the first and second openings are hexagonally defined.

17. A spinner unit for attachment to a substantially vertical rotating shaft of a control unit of a feeder, the control unit having a motor for rotating the shaft, the feeder having a feed storage unit for storing feed and discharging stored feed in a downward direction, the spinner unit comprising:

a housing having a top, a bottom, six sides, the sides being substantially perpendicular to the top and bottom, the top, bottom and sides being joined to form a housing interior and two side openings, the first side opening lying in a plane with one of the sides, and the second side opening lying in a plane with another of the sides, the top and bottom being substantially hexagonal in a plane substantially perpendicular to the control unit rotating shaft, the top having an inlet for receiving feed from the feed storage unit into the housing interior, the housing top and bottom enclosing received feed in the housing interior such that the top substantially covers received feed in the interior between the top inlet and each of the side openings; and a shaft attachment member for attaching the housing to the control unit rotating shaft, such that, when the shaft rotates, the housing spins, and received feed is forced from the housing interior through the side openings.

* * * * *